US007176441B2

(12) United States Patent
Sumitomo et al.

(10) Patent No.: US 7,176,441 B2
(45) Date of Patent: Feb. 13, 2007

(54) COUNTING SYSTEM AND COUNTING METHOD

(75) Inventors: Hironori Sumitomo, Nishinomiya (JP); Koji Fujiwara, Mishima-gun (JP)

(73) Assignee: Konica Minolta Holdings, Inc., Tokyo (JP)

( * ) Notice: Subject to any disclaimer, the term of this patent is extended or adjusted under 35 U.S.C. 154(b) by 323 days.

(21) Appl. No.: 10/698,707

(22) Filed: Oct. 31, 2003

(65) Prior Publication Data

US 2005/0001154 A1 Jan. 6, 2005

(30) Foreign Application Priority Data

Jul. 4, 2003 (JP) .......................... P2003-191809

(51) Int. Cl.
*G06M 7/00* (2006.01)
*H04N 7/18* (2006.01)

(52) U.S. Cl. ....................... 250/221; 340/555; 348/152

(58) Field of Classification Search ................ 250/221, 250/222.1; 340/555–557; 348/143–145, 348/152–155
See application file for complete search history.

(56) References Cited

U.S. PATENT DOCUMENTS 5,255,301 A * 10/1993 Nakamura et al. ............. 377/6
5,410,149 A * 4/1995 Winston et al. ............. 250/221
5,866,887 A * 2/1999 Hashimoto et al. ....... 235/98 R
6,600,509 B1 7/2003 Radford et al. ............. 348/143

FOREIGN PATENT DOCUMENTS

JP 62-103791 A 5/1987
JP 3-232085 A 10/1991
JP 4-120682 A 4/1992
JP 5-266196 A 10/1993
JP 7-44674 A 2/1995
JP 8-161453 A 6/1996
JP 10-009815 A 1/1998
JP 11-282999 A 10/1999

OTHER PUBLICATIONS

Notification of Reason(s) for Refusal, dated Sep. 13, 2005, for counterpart Japanese Patent Application No. 2003-191809; along with an English-language translation thereof.

* cited by examiner

*Primary Examiner*—Stephone B. Allen
(74) *Attorney, Agent, or Firm*—Sidley Austin LLP

(57) ABSTRACT

A counting system is for counting the number of persons passing a monitor line set in the width direction of a path, and has a laser for irradiating the monitor line with a slit ray, and an image capturing apparatus for photographing an area including the monitor line. In the image capturing apparatus, one-dimensional data indicative of a position in which the slit ray is interrupted on the monitor line is generated from an image obtained by the photographing. On the basis of the one-dimensional data, the number of passing persons is counted. By counting the number of passing persons with the one-dimensional data, a very light computation load for the counting can be achieved.

23 Claims, 19 Drawing Sheets

COUNTING SYSTEM AND COUNTING METHOD

This application is based on application No. 2003-191809 filed in Japan, the contents of which are hereby incorporated by reference.

BACKGROUND OF THE INVENTION

1. Field of the Invention

The present invention relates to a technique of counting the number of passing objects to be counted in a path.

2. Description of the Background Art

Conventionally, various methods of detecting passing of an object to be counted such as a person in a path and counting the number of passing times have been proposed.

As an example, there is a known method of disposing a projecting unit for projecting a light beam and a light receiving unit for receiving the light beam while sandwiching a path and detecting passing of a person by using property that a person interrupts a light beam when the person passes the path.

Another known method is a method of emitting a slit ray in the width direction of a path, photographing an area of the position to be irradiated with the slit ray to obtain a two-dimensional image, analyzing the shape of an image of the slit ray in the two-dimensional image, and detecting passage of a person.

The method of disposing a light projecting unit and a light receiving unit while sandwiching a path and detecting passage of a person can be applied to a case where an object to be counted passes one by one like in an automatic checking and collecting machine. In this method, however, in the case where a plurality of objects to be counted are lined in the width direction of the path and pass between the units simultaneously, passage of each of the plurality of objects to be counted cannot be detected.

On the other hand, in the method of detecting passage of a person on the basis of the shape of an image of a slit ray in a two-dimensional image, even when a plurality of objects to be counted pass between the units simultaneously, the passage of each of the plurality of objects can be detected. However, the whole two-dimensional image has to be computed to analyze the shape of the image of the slit ray, so that the computation load is relatively heavy. As a result, the counting process cannot be performed at high speed and it is feared that a counting error occurs.

SUMMARY OF THE INVENTION

The present invention is directed to a counting system for counting the number of passing objects in a path.

According to the present invention, the counting system includes: a light emitter for irradiating a line which extends along a width direction of the path with a slit ray; an image capturing part for photographing the line to obtain an image; a line data generator for generating one-dimensional line data indicative of an irradiation state of the slit ray on the line from the image obtained by the image capturing part; and a counter for counting the number of the passing objects on the basis of the line data.

Since the line data is one-dimensional data, the computation load for counting the number of passing objects can be made very light. In addition, even in the case where a plurality of passing objects are lined in the width direction of the path and pass the line simultaneously, the number of passing objects can be counted.

According to an aspect of the present invention, the line data generator selects a statistical representative value from values of pixels of each pixel column arranged in a second direction orthogonal to a first direction corresponding to a direction of the line in the image, and sets the statistical representative value as a value of a pixel in the line data in the same position as each pixel column.

Even when a slit ray is deviated a little from a position to be inherently irradiated, line data accurately showing the irradiation state of the slit ray is obtained.

According to another aspect of the present invention, the counting system further includes: an interruption data generator for comparing the line data with reference data indicative of a state of the line when the slit ray is not interrupted and generating one-dimensional interruption data indicative of a position in which the slit ray is interrupted on the line. The counter counts the number of the passing objects on the basis of the interruption data.

Thus, the computation load for counting the number of passing objects can be further reduced.

The present invention is also directed to a counting method of counting the number of passing objects to be counted in a path.

Therefore, an object of the present invention is to provide a technique capable of achieving a very light computation load and counting the number of passing objects even in the case where a plurality of passing objects are lined in the width direction of a path and pass simultaneously.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, preferred embodiments of the invention will be described with reference to the drawings.

1. First Preferred Embodiment

1-1. System Configuration

Figure 1:
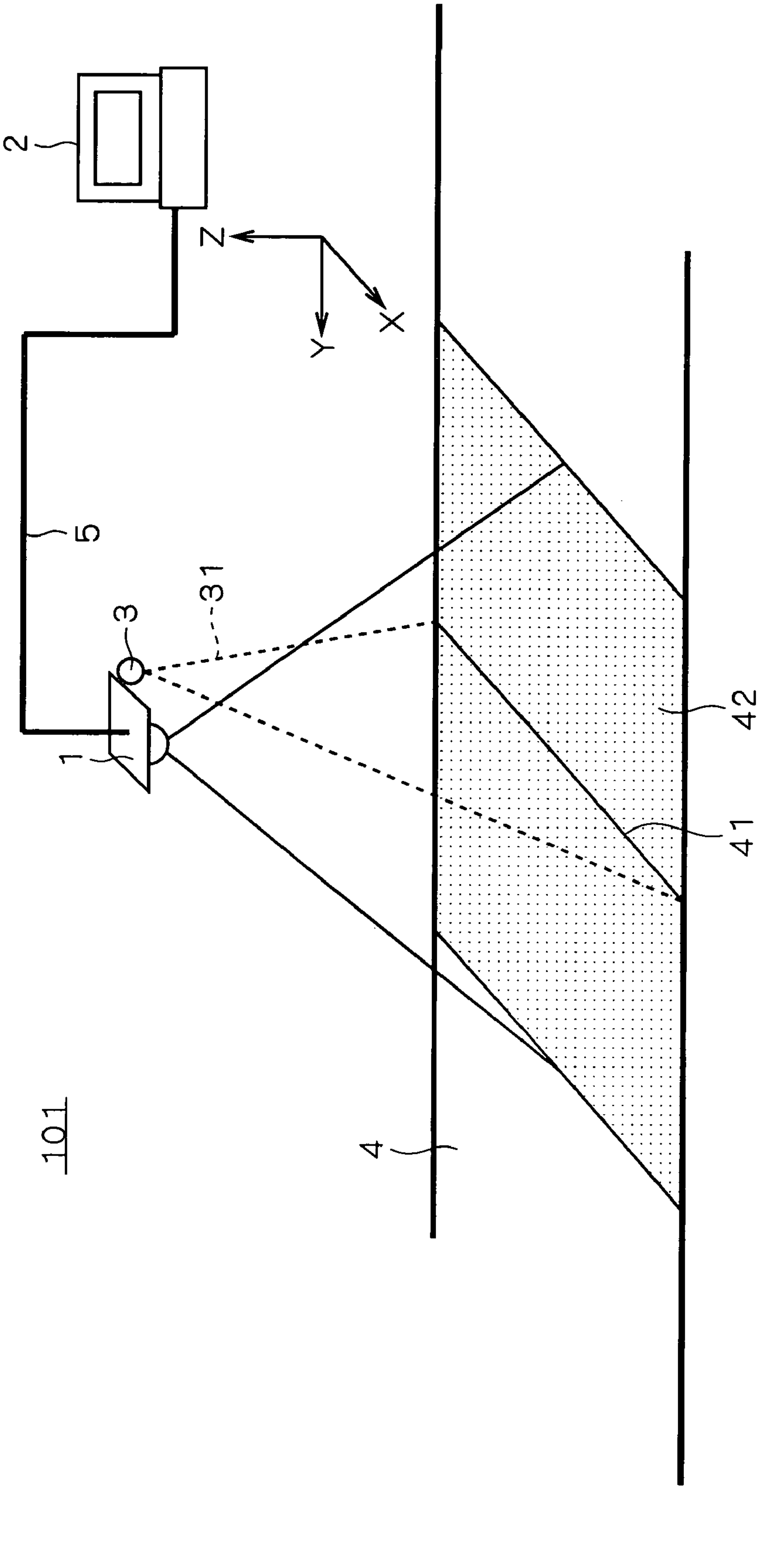
FIG. 1 is a schematic configuration diagram of a counting system of a first preferred embodiment.

FIG. 1 is a schematic configuration diagram of a counting system of a first preferred embodiment of the present invention. This counting system 101 is for counting the number of passing persons as objects to be counted in a path 4. As shown in the diagram, the counting system 101 has a laser 3 as a light source for emitting a slit ray 31, an image capturing apparatus 1 for capturing an area irradiated with the slit ray 31, and a monitoring apparatus 2 for displaying the number of passing persons counted on the basis of a captured image. In the following description, at the time of showing directions and orientations, an XYZ three-dimensional rectangular coordinate system shown in the diagram is properly used. The XYZ axes are fixed relative to the path 4. The X-axis direction is the width direction of the path 4 (direction orthogonal to the travel direction of a person), the Y-axis direction is the travel direction of a person in the path 4, and the Z-axis direction is a perpendicular direction.

In the counting system 101, a line 41 along the width direction (X-axis direction) of the path 4 is virtually set and the number of persons passing the line 41 is counted as the number of persons passing the path 4. In the following, the line 41 will be referred to as a "monitor line" 41. The monitor line 41 is a line which is virtually set and an actually visible line does not exist in the position.

The laser 3 is disposed so that its optical axis is in the vertical direction (Z-axis direction) on the ceiling or the like of the path 4 above in the space where a person passes, and irradiates the monitor line 41 as an object to be irradiated with the slit ray 31. As the slit ray 31, an infrared ray beam as invisible light is employed so that a person as an object to be counted is not aware of being counted.

Similar to the laser 3, the image capturing apparatus 1 is also disposed on the ceiling or the like of the path 4 above the space in which a person passes so as to be arranged in the vicinity of the laser 3. The optical axis of the optical system of the image capturing apparatus 1 is directed almost in the vertical direction (Z-axis direction). In such a configuration, the image capturing apparatus 1 photographs an area 42 including the monitor line 41 from a position near the laser 3. The length in the X-axis direction of the area 42 coincides with the width of the path 4. The image capturing apparatus 1 generates one-dimensional line data indicative of an irradiation state of the slit ray 31 on the monitor line 41 from an image obtained by the photographing and counts the number of passing times of a person on the basis of the line data. The details will be described later.

The monitoring apparatus 2 is constructed by a general computer such as a PC having a CPU, a memory, a hard disk, a display, and the like. The monitoring apparatus 2 is disposed in a monitoring room or the like apart from the path 4. The number of passing people counted by the image capturing apparatus 1 is transferred to the monitoring apparatus 2 via a transmission cable 5. The monitoring apparatus 2 displays the number of passing people or the like transferred from the image capturing apparatus 1. A data communication system from the image capturing apparatus 1 to the monitoring apparatus 2 is not limited to a wired system but may be a wireless system.

Figure 2:
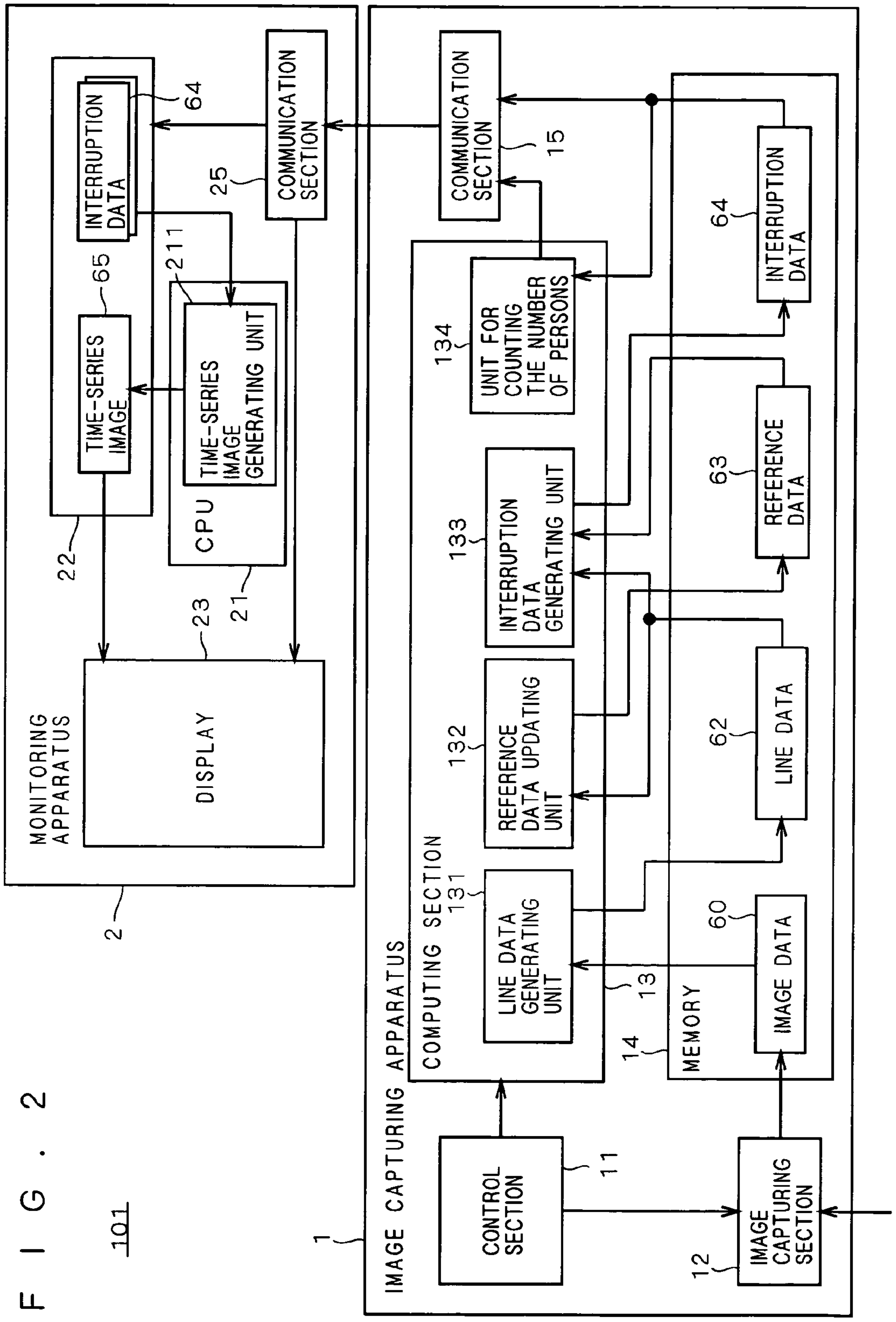
FIG. 2 is a diagram showing the functional configuration of the counting system of the first preferred embodiment.

FIG. 2 is a diagram showing the functional configuration of the image capturing apparatus 1 and the monitoring apparatus 2 of the counting system 101.

As shown in FIG. 2, the image capturing apparatus 1 has a control section 11 for controlling the whole apparatus, an image capturing section 12 for capturing an image, a memory 14 for storing various data, a computing section 13 for executing various computations, and a communication section 15 for performing data communications with the monitoring apparatus 2.

The image capturing section 12 is to capture a two-dimensional image by photographing, as a subject, the area 42 including the monitor line 41 in FIG. 1 and includes an optical system for forming an image from incident light, an image pickup device such as a CCD for photoelectric-converting the formed light image into a signal charge, and an A/D converter for converting the signal charge to a digital signal. To the optical system as an incident path of incident light, a band pass filter for passing only a wavelength range (infrared wavelength range) of the slit ray 31 is attached so that the image pickup device can effectively receive reflection light of the slit ray 31. Alternately, as an on-chip filter on the image pickup device, such a band pass filter may be employed.

The computing section 13 is constructed by an electric circuit and has the functions of various computations. By the functions of the computing section 13, the number of passing people is counted on the basis of an image obtained by the image capturing section 12. A line data generating unit 131, a reference data updating unit 132, an interruption data generating unit 133, and a unit 134 for counting the number of persons, which are schematically shown in FIG. 2 are the functions of the computing section 13. The functions may be realized by software (that is, by computation executed by the CPU or the like in accordance with a program).

The monitoring apparatus 2 has a CPU 21 for performing various computations, a hard disk 22 for storing various data, a display 23 for displaying results of counting and the like, and a communication section 25 for performing data computations with the image capturing apparatus 1.

In the hard disk 22, a dedicated program is pre-stored. When the CPU 21 performs computation in accordance with the program, the various functions of the monitoring apparatus 2 are realized. A time-series image generating unit 211 schematically shown in FIG. 2 is one of the functions realized by computation executed by the CPU 21 in accordance with the program.

1-2. Processes

Figure 3:
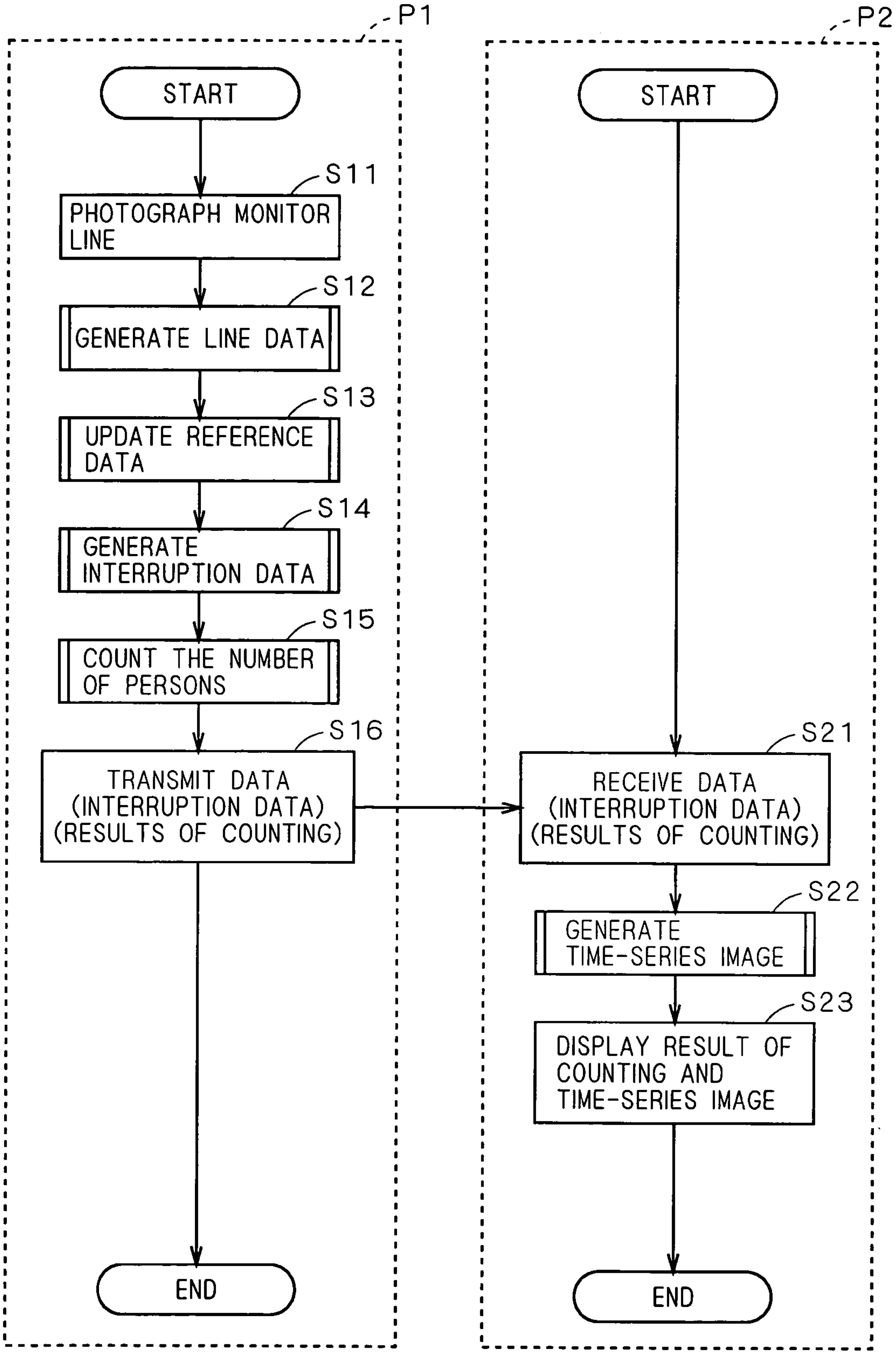
FIG. 3 is a diagram showing the flow of processes of the counting system.

FIG. 3 is a diagram showing the flow of processes of the counting system 101. In FIG. 3, processes shown by sign PI are performed by the image capturing apparatus 1, and processes shown by sign P2 are performed by the monitoring apparatus 2. In the counting system 101, the processes shown in FIG. 3 are repeated in predetermined time cycles. In the following, first, the outline of the processes of the counting system 101 will be described with reference to FIGS. 2 and 3. After that, the details of each of the processes will be described.

First, in a state where the monitor line 41 is irradiated with the slit ray 31 emitted from the laser 3, the area 42 is photographed by the image capturing section 12 of the image capturing apparatus 1. An image captured by the photographing is stored as image data 60 into the memory 14. The value of each pixel in the image data 60 indicates mainly irradiation intensity of an infrared ray in the area 42 and is expressed by, for example, eight bits (0 to 255). Therefore, the value of a pixel corresponding to a position irradiated with the slit ray 31 in the area 42 is relatively high. On the contrary, the value of a pixel corresponding to a position which is not irradiated with the slit ray 31 is relatively low (step S11).

Subsequently, one-dimensional line data 62 indicative of an irradiation state of the slit ray 31 on the monitor line 41 is generated from the image data 60 by the line data generating unit 131 (line data generating process). The generated line data 62 is stored in the memory 14 (step S12).

After that, by the reference data updating unit 132, one-dimensional reference data 63 indicative of the state of the monitor line 41 in a state where the slit ray 31 is not interrupted (a state in which the slit ray 31 is not interrupted by a person) is updated by using the line data 62 (reference data updating process). The reference data 63 is pre-stored in the memory 14 and is updated in every predetermined time cycle (step S13).

By the interruption data generating unit 133, the line data 62 is compared with the reference data 63 and one-dimensional interruption data 64 indicative of the position in which the slit ray 31 is interrupted on the monitor line 41 is generated (interruption data generating process). The generated interruption data 64 is stored into the memory 14 (step S14).

After that, the number of persons passing the monitor line 41 is counted by the unit 134 for counting the number of persons on the basis of information indicative of interruption of the slit ray 31 in the interruption data 64 (step S15).

The interruption data 64 generated in step S14 and the result of counting (the number of passing people) in step S15 are transmitted from the communication section 15 to the monitoring apparatus 2 (step S16).

When the communication section 25 of the monitoring apparatus 2 receives the interruption data 64 and the result of counting from the image capturing apparatus 1 (step S21), the received data is stored into the hard disk 22. In response to the reception of the communication section 25, each of the components of the monitoring apparatus 2 starts performing processing.

First, a predetermined number (eight) of pieces from the latest of the interruption data 64 received from the image capturing apparatus 1 are connected in accordance with generation time by the time-series image generating unit 211, thereby generating time-series images 65 (time-series image generating process). The generated time-series images 65 are stored into the hard disk 22 (step S22).

Both the result of counting (the number of passing people) received by the communication section 25 and the time-series image 65 generated in step S22 are displayed on the display 23 (step S23).

The outline of the processes of the counting system 101 are as described above. As described, such processes of the counting system 101 are repeated in predetermined time cycles. The time cycle of repeating the processes is set to a cycle in which an image of a state where a person passing the path 4 passes over the monitor line 41 (a state where a person interrupts the slit ray 31) at least once can be obtained. When it is assumed that the moving speed of people is 5,000 (mm/sec) and the width of the body in the travel direction of people is 200 (mm), to obtain an image of a state where a passing person is passing over the monitor line 41 at least once, it is necessary to obtain an image in a cycle of 1/25 (second)=200 (mm)/5,000 (mm/sec) (a frame rate of 25 fps or higher). Consequently, in the preferred embodiment, the time cycle of repeating the processes of FIG. 3 is set to 1/30 (sec) (frame rate of 30 fps).

1-2-1. Line Data Generating Process

Figure 4:
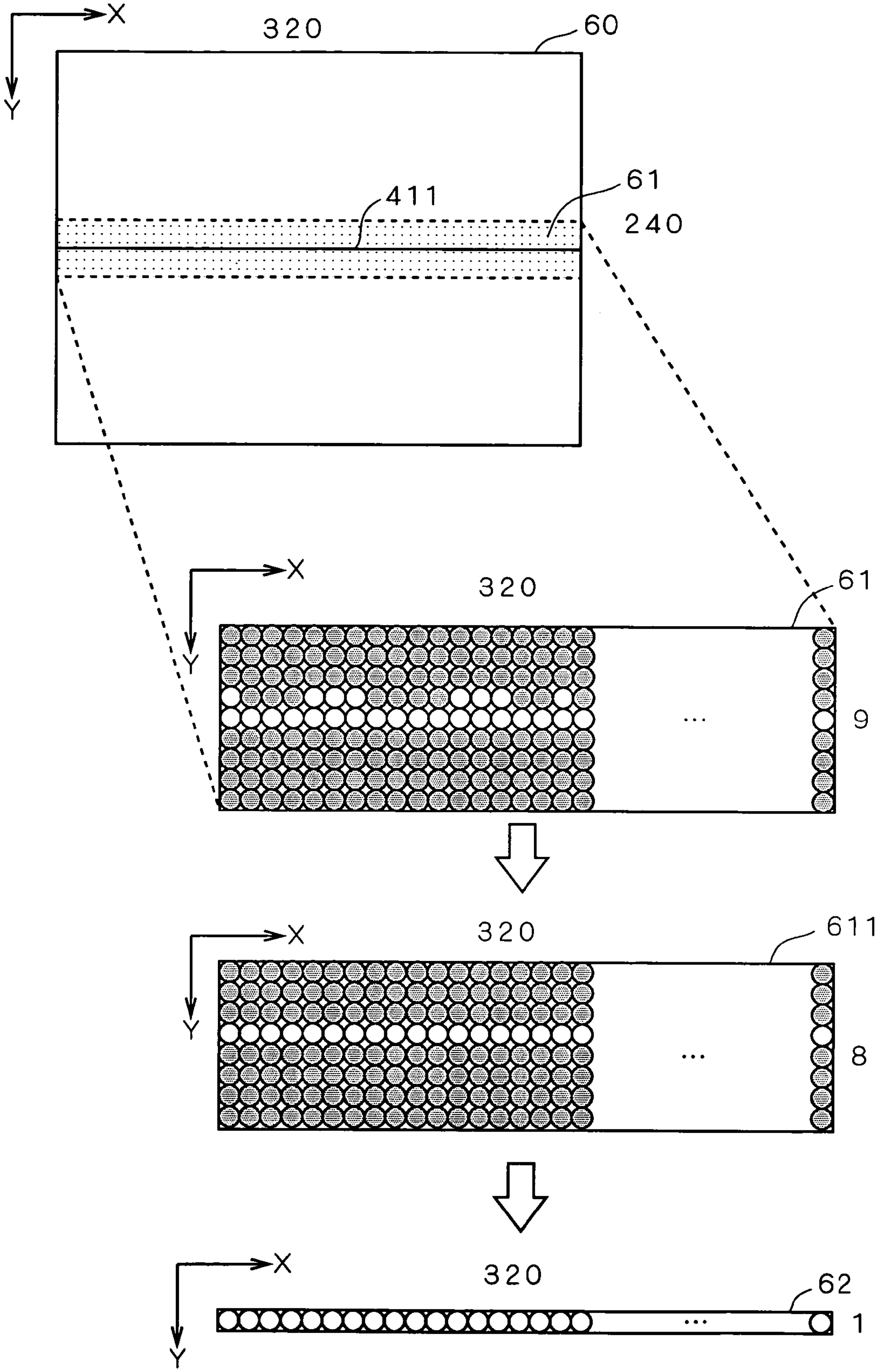
FIG. 4 is a diagram conceptually showing the contents of a line data generating process.

The details of the line data generating process (step S12 in FIG. 3) performed by the line data generating unit 131 will now be described. FIG. 4 is a diagram conceptually showing the line data generating process.

As shown in the diagram, the image data 60 obtained by the image capturing section 12 has 320 pixels in a horizontal direction×240 pixels in a vertical direction (320 horizontal pixels×240 vertical pixels). The image data 60 includes, along the lateral direction, an image (hereinafter, referred to as "monitor line image") 411 showing the monitor line 41 almost in the center in the vertical direction.

In the following description, at the time of expressing the directions and orientations in data such as the image data 60, the same coordinate system shown for the subject in FIG. 1 will be used. Specifically, as shown in FIG. 4, the X-axis direction corresponds to the direction (lateral direction) of the monitor line image 411, and the Y-axis direction corresponds to the direction (vertical direction) orthogonal to the monitor line image 411. The origin of XY coordinates used for expressing the position of a pixel in data such as the image data 60 is set to the position of the upper left end of the data. The rightward direction is set as a positive (+) direction of the X-axis direction, and the downward direction is set as a positive (+) direction of the Y-axis direction.

An object to be processed by the line data generating unit 131 is not the whole image data 60 but a region 61 having 320 horizontal pixels×9 vertical pixels including the monitor line image 411 in the image data 60.

At the time of generating line data, first, the values of two pixels neighboring in the Y-axis direction in the region 61 to be processed are added, thereby generating an image 611. More concretely, when the value of a pixel having a Y coordinate of "n" in the region 61 to be processed is $V_{0n}$ and the value of a pixel having a Y coordinate of "n" in the image 611 is $V_{1n}$, the value of the pixel in the image 611 is expressed as follows.

$$V_{1n}=V_{0n}+V_{0n+1} \quad (1)$$

In such a manner, the image 611 having 320 horizontal pixels×8 vertical pixels is generated.

After the image 611 is generated, the values of eight pixels are compared with each other every pixel column in the Y-axis direction, and the maximum value is selected. The selected maximum value is set as the value of a pixel in the line data 62, which has the same X coordinate as the pixel column from which the maximum value is selected has.

Specifically, when the value of a pixel having an X coordinate of "m" and a Y coordinate of "n" is $V_{1mn}$ in the image 611 and the value of a pixel having an X coordinate of "m" in the line data 62 is $V_{2m}$, the value of a pixel in the line data 62 is expressed as follows.

$$V_{2m}=\max[V_{1m1}, V_{1m2}, \ldots, V_{1m8}] \quad (2)$$

(where "max" denotes the maximum value in []).

By performing the computation of Equation (2) on all of X coordinates in the image 611, the one-dimensional line data 62 consisting of 320 horizontal pixels×1 vertical pixel is generated. The line data 62 indicates the irradiation state of the slit ray 31 on the monitor line 41.

As the line data 62, the monitor line image 411 in the image data 60 can be used as it is. However, in the case where the slit ray 31 emitted is slightly deviated in the Y-axis direction from the monitor line 41 to be inherently irradiated with the slit ray 31, if the monitor line image 411 is used as it is as the line data 62, the line data 62 correctly indicating the irradiation state of the slit ray 31 cannot be obtained.

Therefore, like the preferred embodiment, by using a region obtained by adding a margin in the Y-axis direction to the monitor line image 411 as a region to be processed, selecting the maximum value from the pixel values every pixel column in the Y-axis direction in the region to be processed, and setting the maximum value as the value of the pixel in the line data 62 in the same position as the pixel column, even if the slit ray 31 is deviated from a position to be inherently irradiated, the line data 62 correctly indicating the irradiation state of the slit ray 31 can be obtained without being influenced by such a deviation.

Further, by adding the values of two pixels neighboring in the Y-axis direction prior to the selection of the maximum value from the values of pixels like in the preferred embodiment, even in the case where reflection light of the slit ray 31 is received by two pixels in the image pickup device, the pixel value can be prevented from deterioration caused by the above. As a result, the line data 62 accurately indicating the irradiation state of the slit ray 31 can be obtained without being influenced by the number of pixels receiving the reflection light of the slit ray 31.

The line data generating method in the preferred embodiment can be also expressed as a method of "selecting a statistical representative value in a pixel column and using the statistical representative value as the value of a pixel in line data in the same position as the pixel column". By employing such a method, line data accurately indicative of the irradiation state of slit ray can be obtained without being influenced by the irradiation state of slit ray.

1-2-2. Reference Data Updating Process

Figure 5:
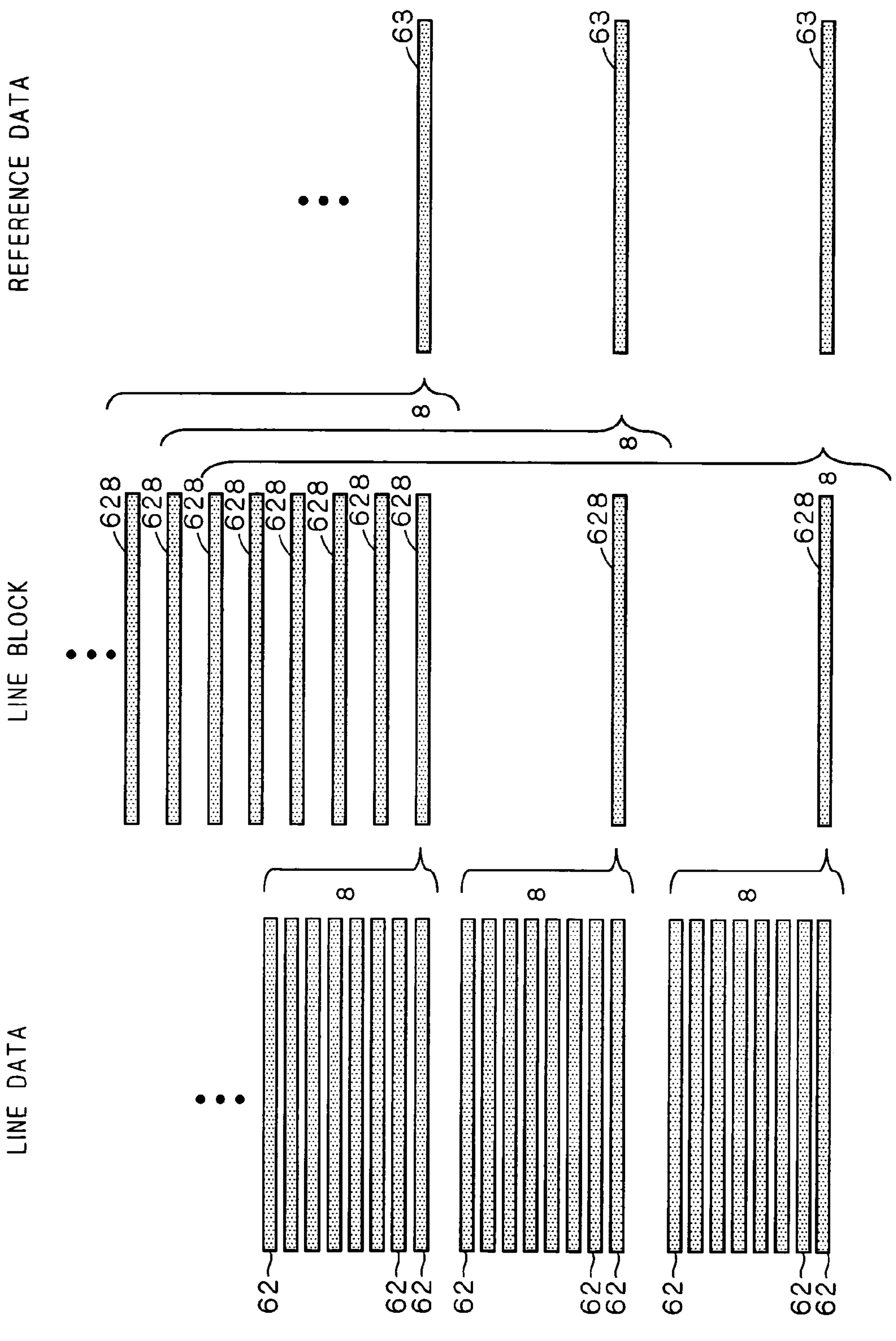
FIG. 5 is a diagram conceptually showing the contents of a reference data updating process.

The details of the reference data updating process (step S13 in FIG. 3) performed by the reference data updating unit 132 will now be described. FIG. 5 is a diagram schematically showing the details of the reference data updating process.

As described above, the processes shown in FIG. 3 are repeated in the predetermined time cycles, so that a piece of line data 62 is newly generated each time the reference data updating process is performed. In the reference data updating process, when eight pieces of the line data 62 generated in the predetermined time cycles are generated, a one-dimensional line block 628 is generated on the basis of the eight pieces of line data 62.

At the time of generating the line block 628, first, the values of eight pixels having the same X coordinate in the eight pieces of line data 62 are compared with each other and the maximum value is selected from the values. The selected maximum value is set as the value of a pixel in the line block 628 in the X coordinate. By performing such a process on all of X coordinates, the line block 628 is generated.

More concretely, when the eight pieces of line data 62 are referred to as first line data, second line data, . . . , the value of a pixel having an X coordinate of "m" in the k-th line data is referred to as $V_{2mk}$, and the value of a pixel having an X coordinate of "m" in the line block 628 is referred to as $V_3$m, the value of a pixel in the line block 628 is expressed as follows.

$$V_{3m}=\max[V_{2m1}, V_{2m2}, \ldots, V_{2m8}] \tag{3}$$

(where "max" denotes the maximum value in [ ]).

By executing computation of Equation (3) on all of X coordinates, one-dimensional line block 628 consisting of 320 horizontal pixels×1 vertical pixel is generated.

After the line block 628 is generated, on the basis of eight line blocks 628 generated similarly in the past, the reference data 63 is generated. A method of generating the reference data 63 on the basis of eight line blocks 628 is similar to the method of generating the line block 628 on the basis of eight pieces of line data 62.

To be specific, when the eight line blocks 628 are referred to as a first line block, a second line block, . . . , the value of a pixel having an X coordinate of "m" in the k-th line block is referred to as $V_{3mk}$, and the value of a pixel having an X coordinate of "m" in the reference data 63 is referred to as $V_{4m}$, the value of a pixel in the reference data 63 is expressed as follows.

$$V_{4m}=\max[V_{3m1}, V_{3m2}, \ldots, V_{3m8}] \tag{4}$$

(where "max" denotes the maximum value in []).

By executing computation of Equation (4) on all of X coordinates, the reference data 63 consisting of 320 horizontal pixels×1 vertical pixel is generated. With the reference data 63, the reference data 63 in the memory 14 is overwritten. Therefore, the reference data 63 is newly generated each time eight pieces of the line data 62 are obtained. With the reference data 63, the reference data 63 in the memory 14 is updated.

Figure 6:
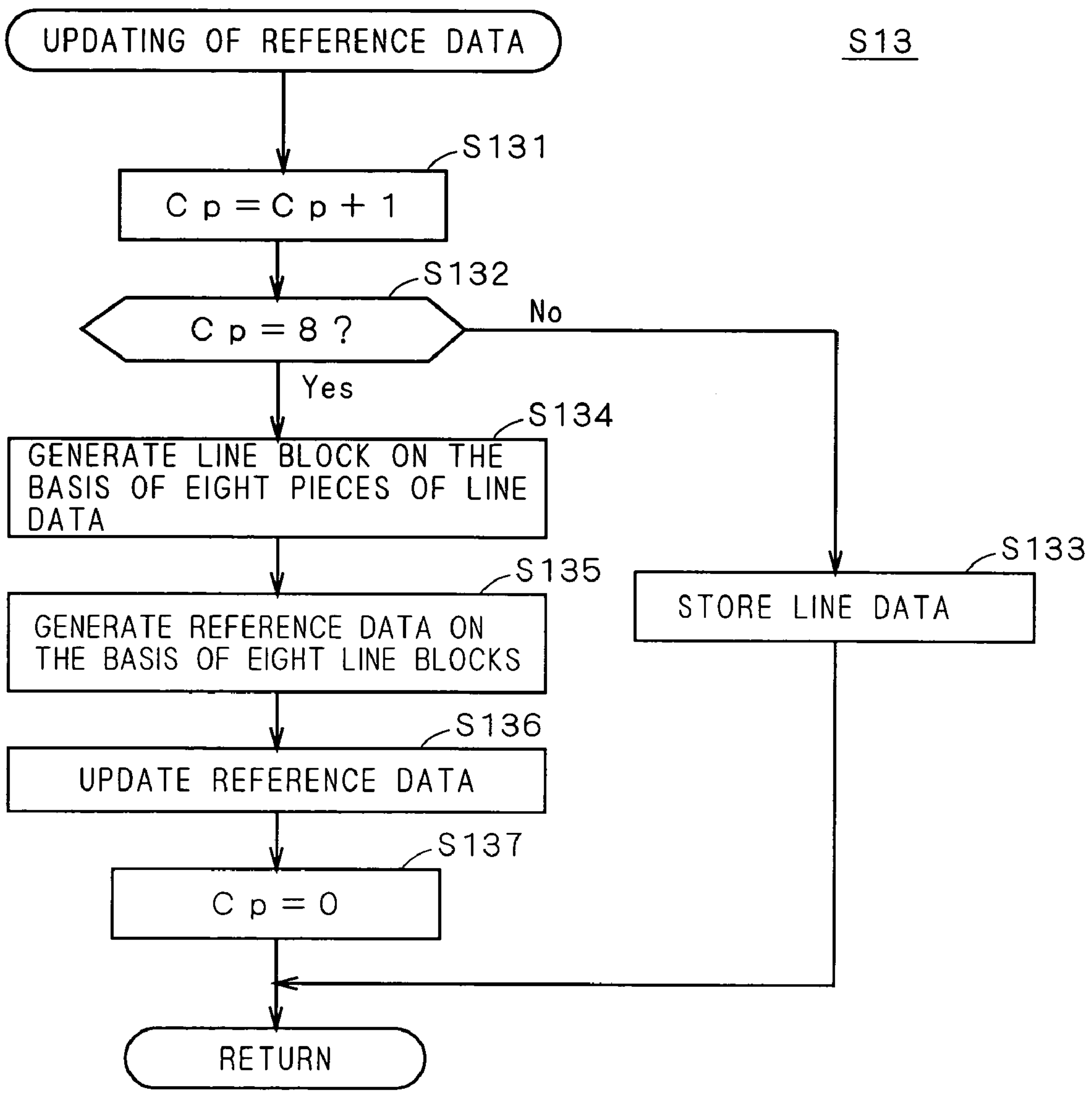
FIG. 6 is a diagram showing the flow of the reference data updating process.

FIG. 6 is a flowchart showing the flow of the reference data updating process. In the reference data updating process, a count variable Cp as a variable indicative of the number of pieces of the line data 62 stored in the memory 14 is used. The count variable Cp is incremented by one at the time point of start of the reference data updating process (step S131) and is reset to "0" at the time point when the line block 628 is generated (step S137).

After step S131, whether the count variable Cp is equal to 8 or not is determined. When the count variable Cp is smaller than 8 (No in step S132), the number of pieces of the line data 62 necessary to generate the line block 628 is short. Consequently, the line data 62 newly generated is stored in the memory 14 (step S133), and the reference data updating process is finished.

On the other hand, when the count variable Cp becomes 8 (Yes in step S132), the number of pieces of the line data 62 necessary to generate the line block 628 becomes sufficient. Therefore, one line block 628 is generated on the basis of the eight pieces of line data 62. The generated line block 628 is stored in the memory 14. After the line block 628 is generated, out of the eight pieces of line data 62 used for generation, seven pieces of line data 62 other than the line data 62 generated the latest are deleted (step S134).

Subsequently, on the basis of eight line blocks 628 of the one line block 628 generated in step S134 and seven line blocks 628 generated in the past, the reference data 63 is generated (step S135), and the reference data 63 in the memory 14 is updated (step S136). After the reference data 63 is generated, the line block 628 generated first among the eight line blocks 628 used for the generation is deleted. The count variable Cp is reset to "0" (step S137), and the reference data updating process is finished.

As described above, the reference data 63 is generated on the basis of the eight line blocks 628 generated most recently, and the line block 628 is generated on the basis of the eight pieces of line data 62 generated most recently. Therefore, the reference data 63 is substantially generated on the basis of 64 pieces of the line data 62 generated most recently and indicates the maximum pixel value of 64 pieces of the line data 62 for each X coordinates.

As described above, by updating the reference data 63 on the basis of the predetermined number of line data 62 generated most recently, even in the case where environment light emitted to the monitor line 41 changes, accurate interruption data can be obtained in the interruption data generating process.

In the case where the path 4 is in a room or the like in which environment light does not change, the state of the monitor line 41 when the slit ray 31 is not interrupted can be regarded as constant, such a reference data updating process may not be performed.

The reference data 63 can be also generated by comparing not eight line blocks 628 but 64 pieces of line data 62. However, by generating the line block 628 indicative of the maximum value in each of X coordinates each time a predetermined number of line data 62 is obtained like in the preferred embodiment, the amount of data stored in the memory 14 can be reduced, the amount of data to be compared at the time of generating the reference data 63 can be reduced, and computation time can be shortened.

1-2-3. Interruption Data Generating Process

Figure 7:
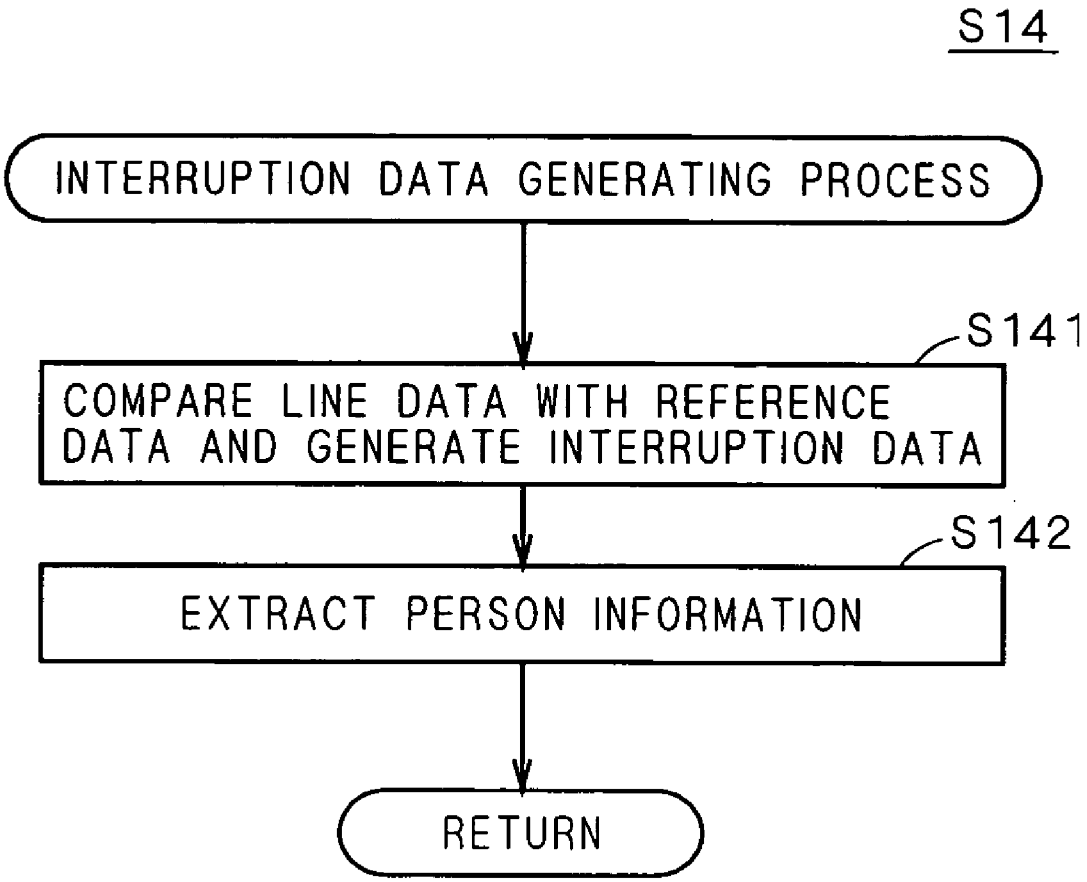
FIG. 7 is a diagram showing the flow of an interruption data generating process.

The details of the interruption data generating process (step S14 in FIG. 3) performed by the interruption data generating unit 133 will now be described. FIG. 7 is a flowchart showing the flow of the interruption data generating process.

First, the line data 62 generated in step S12 is compared with the reference data 63 in the memory 14. On the basis of the result of comparison, the interruption data 64 is generated. More concretely, first, attention is paid to a pixel in the reference data 63 and a pixel in the line data 62 having the same X coordinate, and the value of the pixel of the line data 62 is subtracted from the value of the pixel of the reference data 63. When the result of subtraction is larger than a predetermined threshold, "1" is set as the value of the pixel in the interruption data 64 of the X coordinate. When the result of subtraction is smaller than the predetermined value, "0" is set. By performing the process on all of the X coordinates, the interruption data 64 is generated (step S141).

In the case where the result of subtraction performed between the line data 62 and the reference data 63 is larger than the predetermined threshold, the slit ray 31 is interrupted in the position on the monitor line 41 corresponding to the pixel and the position is not irradiated with the slit ray 31. On the contrary, when the result of subtraction performed between the pixels is smaller than the predetermined threshold, the slit ray 31 is not interrupted in the position on the monitor line 41 corresponding to the pixel and the position is irradiated with the slit ray 31. Therefore, the interruption data 64 is binary data in which a value of each pixel (data in each of positions on the monitor line 41) is either "1" indicating that the slit ray 31 is interrupted with respect to a pixel or "0" indicating that the slit ray 31 is not interrupted. In other words, the interruption data 64 indicates the position in which the slit ray 31 is interrupted on the monitor line 41 by "1" and indicates the position in which the slit ray 31 is not interrupted on the monitor line 41 by "0".

In the interruption data 64 generated as described above, "1" is also set for a pixel corresponding to the position in which the slit ray 31 is interrupted by a substance other than a person. That is, the interruption data 64 includes information of a substance other than a person. Consequently, the interruption data generating unit 133 performs, after generation of the interruption data 64, a process of extracting only information indicative of a person (hereinafter, referred to as "person information") from the generated interruption data 64 (step S142).

FIGS. 8 to 11 are diagrams each conceptually showing the process of extracting the person information from the interruption data 64. In each of the diagrams, positions of pixels having the value of "1" are hatched in the interruption data 64. As indicated by reference numerals f1 to f6 in the diagrams, a group of pixels having the value of "1" which are continuous with respect to positions (a group of pixels continuous with respect to positions, indicating a state in which the slit ray 31 is interrupted) in the interruption data 64 will be referred to as "interruption information".

In the preferred embodiment, the "interruption information" having the number of continues pixels (the number of pixels) which is larger than "60" as a first reference number is regarded as "person information". In the process of extracting the person information, "person information" is extracted from original data 641 as the interruption data 64 generated in step S141 and moved to output data 642 as the interruption data 64 for output.

Figure 8:
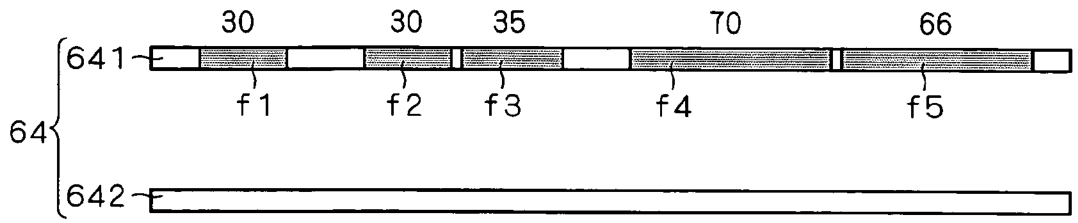
FIGS. 8 to 11 are diagrams conceptually showing the contents of a process of extracting information of a person from interruption data.
Figure 9:
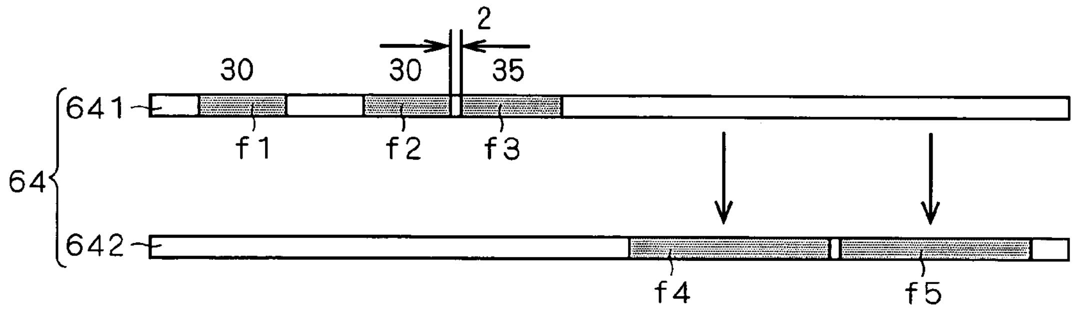

For example, the original data 641 shown in FIG. 8 includes the interruption information f1 having the number of pixels of "30", the interruption information f2 having the number of pixels of "30", the interruption information f3 having the number of pixels of "35", the interruption information f4 having the number of pixels of "70", and the interruption information f5 having the number of pixels of "66". Among the interruption information f1 to f5, interruption information whose pixel number exceeds "60" is the interruption information f4 and f5. Consequently, as shown in FIG. 9, the interruption information f4 and f5 is regarded as person information and moved to the output data 642. The process of moving the person information from the original data 641 to the output data 642 will be referred to as a "person information moving process" hereinafter.

In the interruption data 64 generated in step S141, there is a case that interruption information which is inherently person information is parted due to the influence of noise. In the preferred embodiment, to extract the parted interruption information properly as person information, among groups of pixels having the value "0" continuously with respect to positions, a group of which number of continuous pixels (the number of pixels) is less than "3" as a second reference number is determined as noise, and the value is changed to "1".

Figure 10:
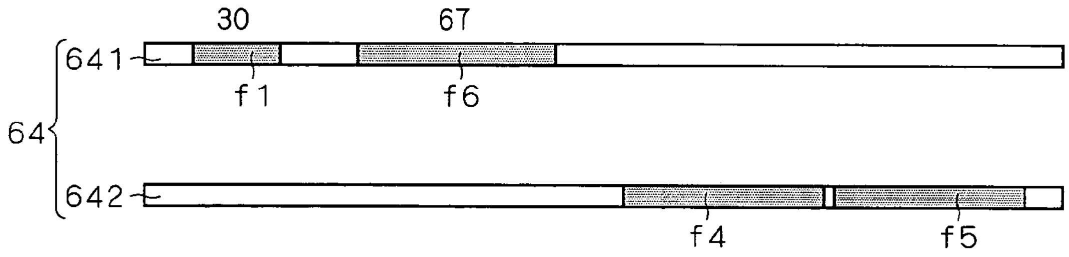

For example, in the original data 641 shown in FIG. 9, a group of pixels having the value of "0" and of which number of continuous pixels is "2" exists between the interruption information f2 and the interruption information f3. Consequently, as shown in FIG. 10, the value of the pixel group is changed to "1". By the operation, the influence of noise is eliminated, and the interruption information f6 parted into the interruption information f2 and the interruption information f3 by noise is reconstructed. The process of eliminating noise will be referred to as "noise eliminating process" hereinafter.

Figure 11:
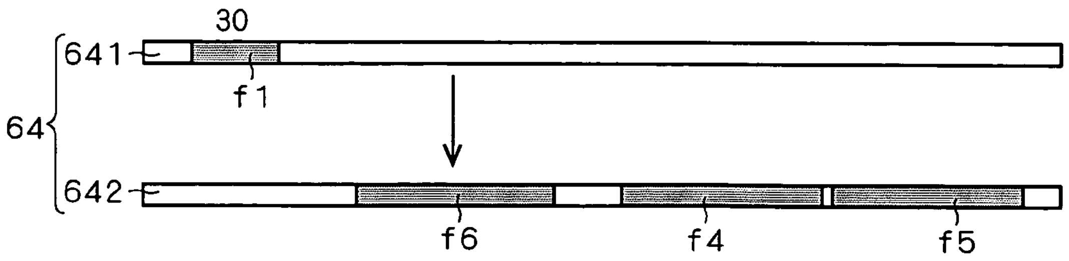

After the noise eliminating process is performed, the person information moving process is performed again. For example, in the original data 641 shown in FIG. 10, the interruption information f6 having the number of pixels of "67", which has been reconstructed by the noise eliminating process exists. As shown in FIG. 11, therefore, the interruption information f6 is determined as person information and moved to the output data 642.

As described above, in step S142, the "person information moving process (hereinafter, referred to as "first person information moving process"), "noise eliminating process", and "person information moving process (hereinafter, referred to as "second person information moving process") are performed in accordance with this order. By the processes, the output data 642 obtained by extracting only the "person information" from the original data 641 is generated as the interruption data 64 for output.

In step S142, prior to the "noise eliminating process", the "first person information moving process" is performed for the following reason. In the case where the "noise eliminating process" and the "second person information moving process" are performed without executing the "first person information moving process", a problem occurs such that person information of a plurality of passing persons who are close to each other is dealt as person information of one person. For example, when the number of continuous pixels of the group of pixels having the value of "0" between the person information f4 and f5 is less than "3" in the original data 641 shown in FIG. 8, the person information f4 and f5 is connected to each other and the resultant information is processed as one piece of person information. Consequently, by performing the "first person information moving process" prior to the "noise eliminating process" as in the preferred embodiment, each of a plurality of pieces of person information of different persons is processed as person information of each person. Thus, the problem can be avoided.

Although one piece of person information is parted by noise in the above-described case, on the contrary, there is a case such that a plurality of pieces of person information are connected by noise and become one piece of person information. Consequently, person information having the number of pixels which is larger than, for example, double of the first reference number may be parted every first reference number.

1-2-4. Process of Counting the Number of Persons

The details of the process of counting the number of persons by the unit 134 for counting the number of persons (step S15 in FIG. 3) will now be described.

In the process of counting the number of persons, person information is obtained from the most-recent interruption data 64. The person information is compared with person information obtained from the past interruption data 64. In the following, the person information obtained from the interruption data 64 generated most recently will be referred to as "present data" and person information obtained from the past interruption data 64 will be referred to as "past data". The past data is person information indicative of a person interrupting the slit ray 31 at the time point when the process of counting the number of persons was performed last time, and is stored in the memory 14. In the process of counting the number of persons, the person information is expressed by three-coordinates information of an X coordinate at the left end (hereinafter, referred to as "start coordinate"), an X coordinate at the right end (hereinafter, referred to as "end coordinate"), and an X coordinate in the center between the right and left ends (hereinafter, referred to as "barycentric coordinate").

Figure 12:
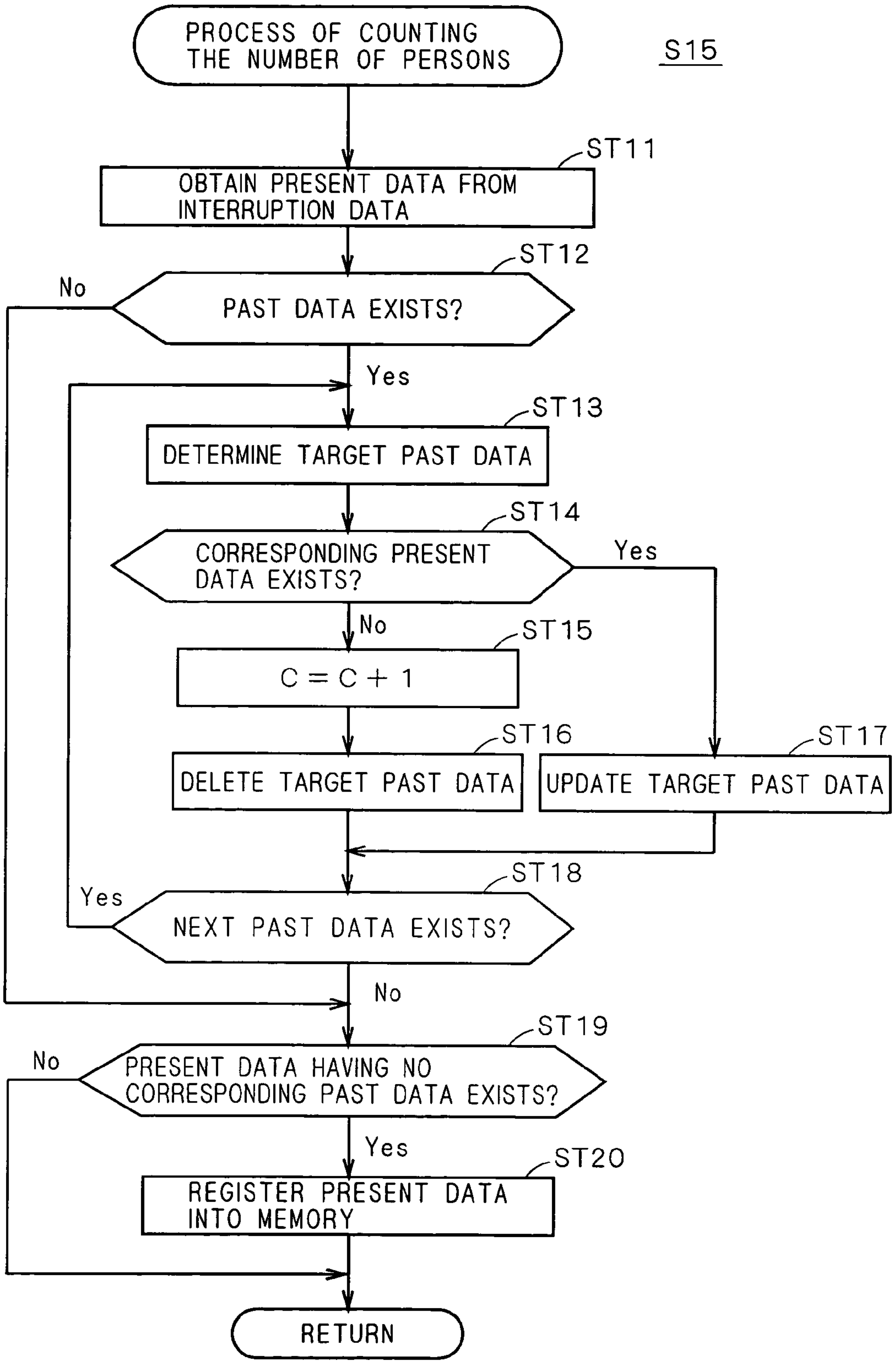
FIG. 12 is a diagram showing the flow of a process of counting the number of persons.

FIG. 12 is a flowchart showing the flow of the process of counting the number of persons. With reference to FIG. 12, the flow of the process of counting the number of persons will be described below.

First, the interruption data 64 generated most recently is referred to and the present data is obtained (step ST11). Obviously, there may be a case that a plurality of pieces of present data exists in the interruption data 64.

Next, the past data stored in the memory 14 is referred to (step ST12). In the case where the past data is not stored in the memory 14, the process advances to step ST19. On the other hand, in the case where the past data is stored in the memory 14, a piece of past data to be processed thereafter (hereinafter, "target past data") is determined from the past data (step ST13).

Whether present data corresponding to the target past data, that is, present data of the same person as that of the target past data exists or not is determined. In the preferred embodiment, whether the past data and present data is of the same person or not is determined by whether a deviation between the barycentric coordinate of the past data and the barycentric coordinate of the present data is within a predetermined threshold (for example, 10 pixels) or not (step ST14).

If corresponding present data does not exist, the person of the target past data has already passed the monitor line 41. Consequently, a variable C indicative of the number of persons passing the monitor line 41 is incremented by "1" (step ST15). The person information as the target past data is eliminated from the memory 14 (step ST16).

On the other hand, if corresponding present data exists, the person of the target past data still interrupts the slit ray 31 at the present time point and is passing the monitor line 41 (has not passed the monitor line 41). Consequently, the variable C indicative of the number of passing persons is not incremented and the coordinate information of the person information in the memory 14 which became the target past data is updated to the coordinate information of the corresponding present data (step ST17).

After one piece of the target past data is compared with the present data, the next target past data is determined (steps ST18 and ST13). In a manner similar to the above, the target past data is compared with present data. By repeating such a process, finally, all of the past data pieces are compared with present data.

After all of the past data is compared with the present data or in the case where no past data is stored in the memory 14, whether present data which does not correspond to any past data exists in the present data obtained in step ST11 or not is determined (step ST19).

In the case where the present data which does not correspond to any past data exists, the present data indicates a new person who is passing the monitor line 41 and interrupts the slit ray 31. Consequently, the present data is registered as new person information into the memory 14 (step ST20). The registered person information is used as past data in the process of counting the number of persons of the next time and thereafter.

Figure 13:
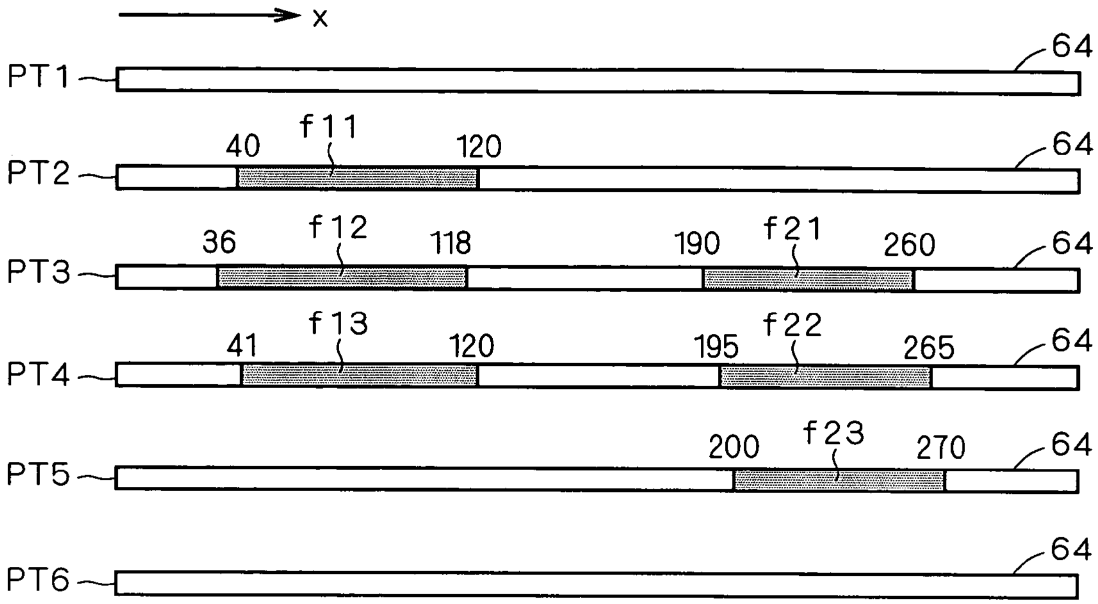
FIGS. 13 and 14 are diagrams showing an example of a plurality of pieces of interruption data generated continuously with respect to time.

FIG. 13 is a diagram showing an example of a plurality of pieces of interruption data 64 generated continuously with respect to time. Referring to FIG. 13, the process of counting the number of persons will be concretely described below. In FIG. 13, reference numerals PT1 to PT6 denote time points when the interruption data 64 is generated. The lower the interruption data 64 is, the newer. In FIG. 13, the position of a pixel having the value of "1" is hatched in the interruption data 64. It is assumed that no past data exists in the memory 14 at the time point PT1.

Since both present data and past data does not exist at the time point PT1, nothing is done in the process of counting the number of persons.

At time point PT2, present data f11 of (start coordinate, end coordinate, barycentric coordinate)=(40, 120, 80) is obtained and is registered as new person information into the memory 14.

At time point PT3, present data f12 of (36, 118, 77) corresponding to the past data f11 exists, so that the coordinate information of the person information in the memory 14 which became the past data f11 is updated to the coordinate information (36, 118, 77) of the present data f12. On the other hand, present data f21 of (190, 260, 225) which does not correspond to any past data is obtained and the coordinate information of the present data f21 is registered as coordinate information of new person information into the memory 14.

At time point PT4, present data f13 (41, 120, 80.5) corresponding to the past data f12 exists, so that the coordinate information of the person information in the memory 14 which became the past data f12 is updated to the coordinate information (41, 120, 80.5) of the present data f13. Since present data f22 (195, 265, 230) corresponding to the past data f21 exists, the coordinate information of the person information in the memory 14 which became the past data f21 is updated to coordinate information (195, 265, 230) of the present data f22.

At time point PT5, present data corresponding to the past data f13 does not exist. Consequently, it is determined that the person of the past data f13 has passed and the variable C indicative of the number of passing persons is incremented by "1". On the other hand, present data f23 (200, 270, 235) corresponding to the past data f22 exists, so that the coordinate information of the person information in the memory 14 corresponding to the past data f22 is updated to the coordinate information (200, 270, 235) of the present data f23.

At time point PT6, present data corresponding to the past data f23 does not exist. Therefore, it is determined that the person of the past data f23 has passed and the variable C indicative of the number of passing persons is incremented by "1".

As described above, in the process of counting the number of persons, even in the case where a plurality of persons lined in the width direction of the path 4 pass simultaneously, the person information of each of the plurality of persons is processed, so that the number of persons can be counted for each of the persons. Since the interruption data 64 dealt in the process of counting the number of persons is one-dimensional binary data, the computation load of the process of counting the number of persons can be made very light.

1-2-5. Time-Series Image Generating Process

The details of the time-series image processing process (step S22 in FIG. 3) performed by the time-series image generating unit 211 will now be described.

Figure 14:
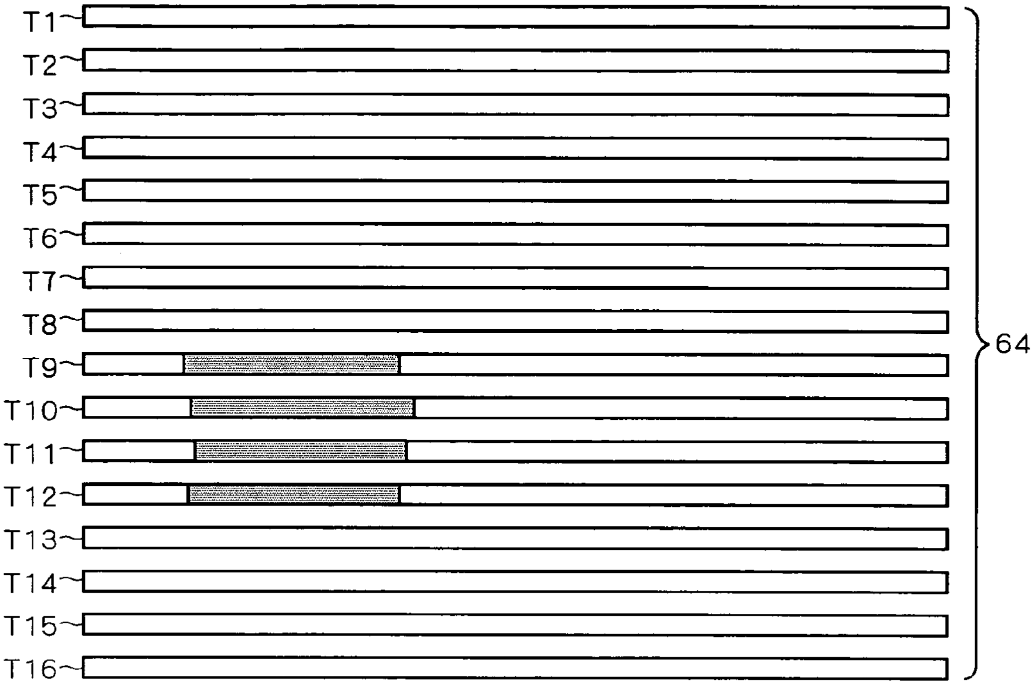

FIG. 14 is a diagram showing an example of the plurality of pieces of interruption data 64 generated continuously with respect to time. The interruption data 64 is transmitted from the image capturing apparatus I to the monitoring apparatus 2 and stored in the hard disk 22 of the monitoring apparatus 2. In FIG. 14, reference numerals T1 and T16 denote time points when the interruption data 64 is generated. The lower the interruption data 64 is, the newer. In FIG. 14, the position of a pixel having the value of "1" is hatched in the interruption data 64.

Figure 15:
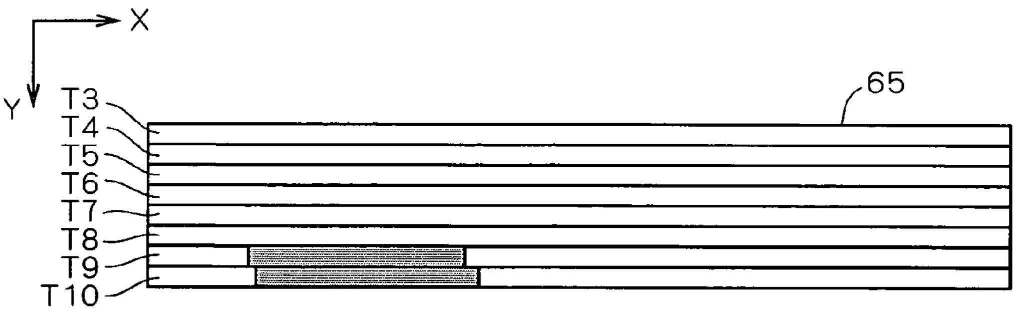
FIG. 15 is a diagram showing an example of time-series images.

In the time-series image generating process, the latest eight pieces of interruption data 64 are connected in the Y-axis direction in accordance with generation time, thereby generating a time-series image 65. For example, at time point T10, eight pieces of interruption data 64 generated at time points T3 to T10 are connected, thereby generating the time-series image 65 shown in FIG. 15. The time-series image 65 generated in such a manner is displayed on the display 23 together with the number of passing persons. Different colors are used for a display color of a pixel having the value of "1" and a display color of a pixel having the value of "0" in the time-series image 65.

Figure 16:
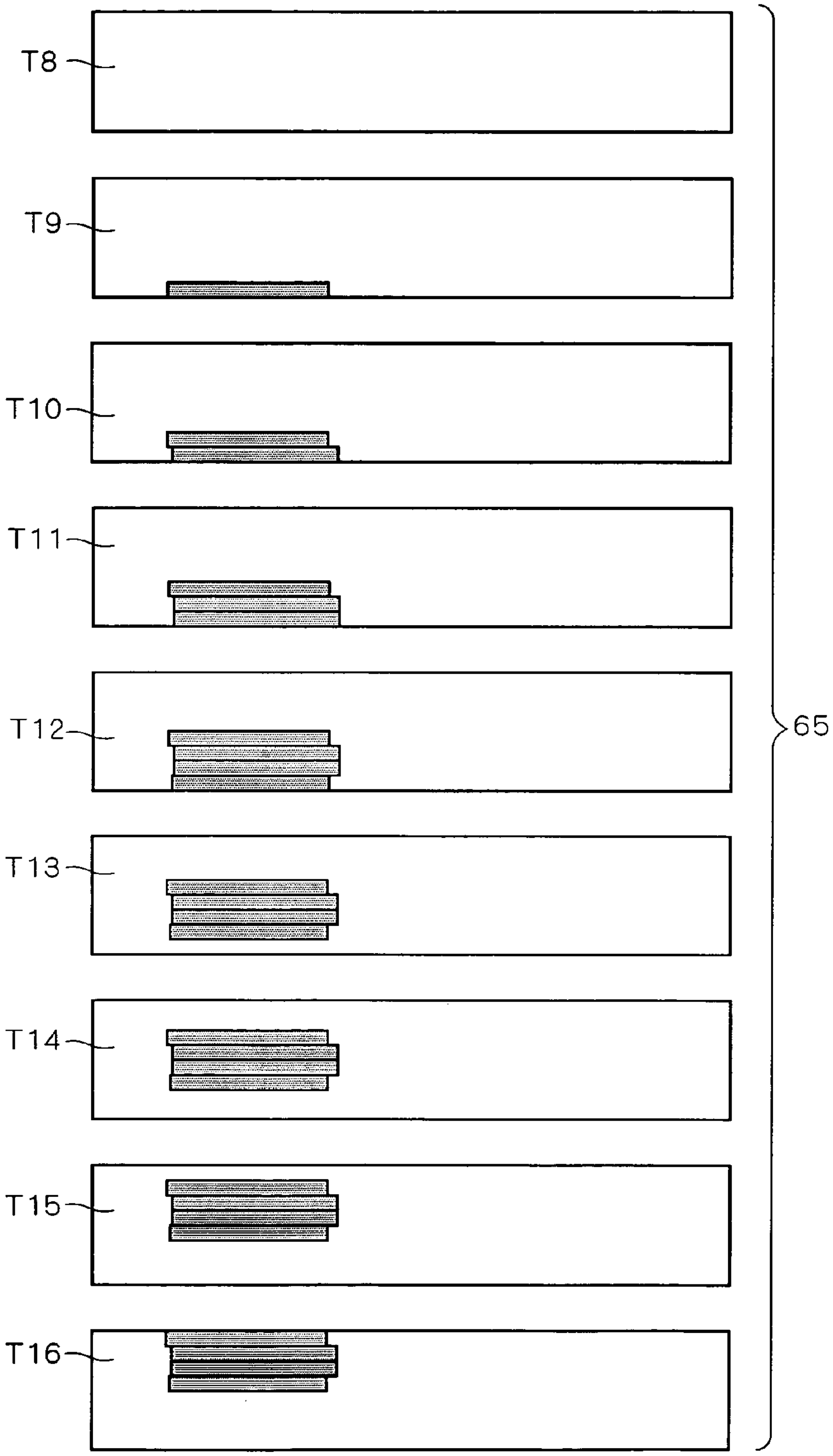
FIG. 16 is a diagram showing an example of a plurality of time-series images generated continuously with respect to time.

FIG. 16 is a diagram showing the time-series images 65 generated at time points T8 to T16 when a plurality of pieces of interruption data 64 shown in FIG. 14 are obtained. In FIG. 16, the positions of pixels having the value "1" are hatched in the time-series images 65. Each time the time-series image 65 is generated, it is displayed in the same position in the screen of the display 23. By displaying the time-series images 65 continuously with respect to time, the region indicative of the pixel having the value "1" moves like animation on the screen of the display 23. The user of the monitoring apparatus 2 can visually grasp a state where a person is passing the monitor line 41 by referring to display of the time-series images 65.

As described in the first preferred embodiment, in the counting system 101 of the preferred embodiment, at the time of counting the number of persons passing the path 4, the line data 62 is generated. On the basis of the interruption data 64 generated from the line data 62, the number of passing persons is counted. Since each of the line data 62 and the interruption data 64 is one-dimensional data, the computation load for counting the number of passing persons can be made very light. In addition, even when a plurality of persons who are lined in the width direction of the path 4 simultaneously pass the monitor line, the number of the persons can be counted.

2. Second Preferred Embodiment

A second preferred embodiment of the present invention will now be described. In the first preferred embodiment, at the time of counting the number of passing persons in the path 4, the travel directions of the persons are not considered. In the second preferred embodiment, the travel direction of a person is also considered and the number of passing persons is counted in each of the directions.

Figure 17:
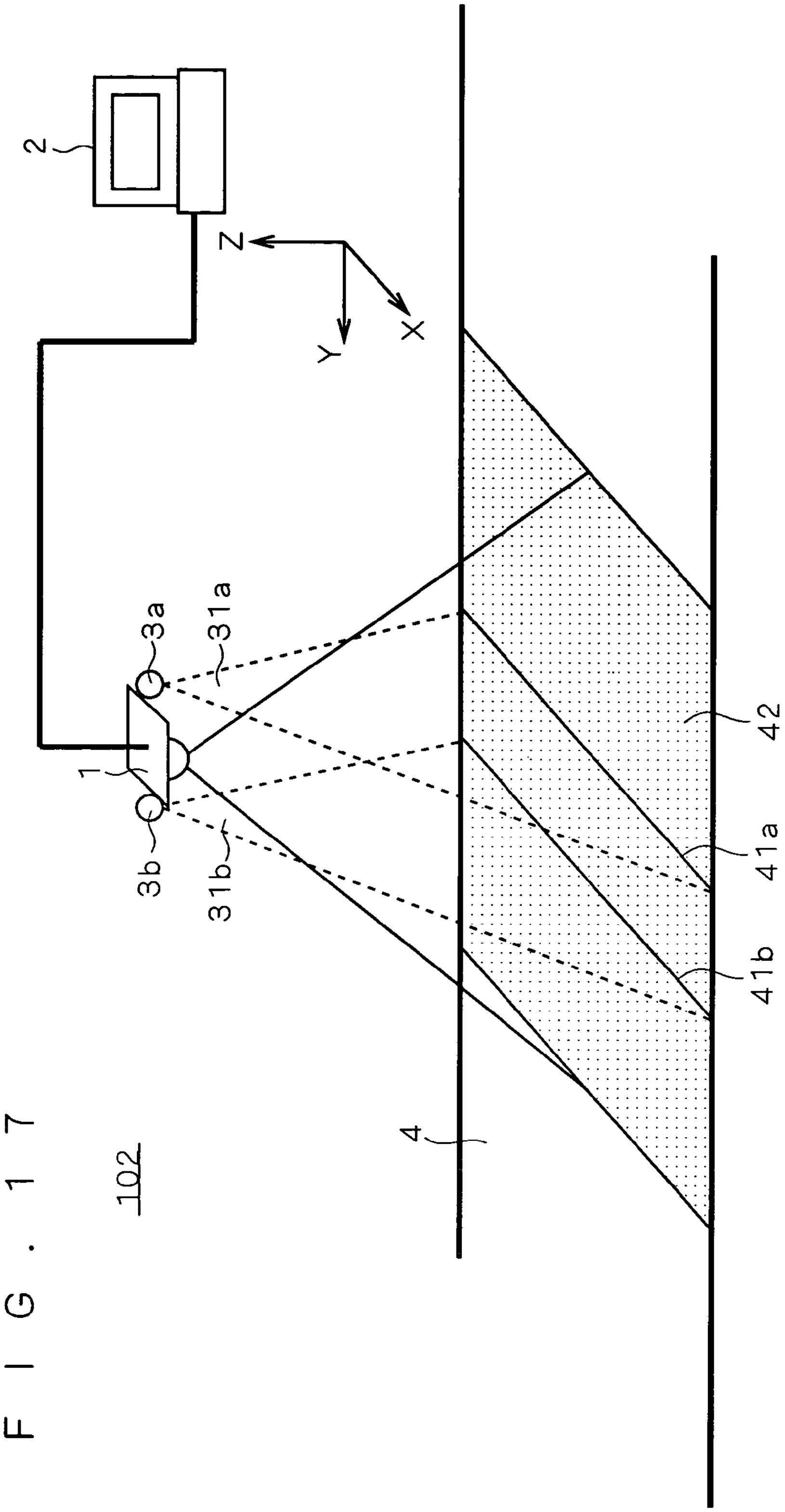
FIG. 17 is a schematic configuration diagram of a counting system of a second preferred embodiment.

FIG. 17 is a schematic configuration diagram of a counting system 102 of the second preferred embodiment. The configuration of the counting system 102 of the second preferred embodiment is similar to that of the counting system 101 of the first preferred embodiment. Consequently, the same reference numerals are designated to the same configurations and their detailed description will not be repeated. As shown in the diagram, in the second preferred embodiment, two monitor lines 41*a* and 41*b* are provided so as to extend in the width direction (X-axis direction) of the path in parallel with each other at an interval. Two slit rays 31*a* and 31*b* are emitted to the two monitor lines 41*a* and 41*b*, respectively. For this purpose, two lasers 3*a* and 3*b* are disposed near the image capturing apparatus 1. The image capturing apparatus 1 photographs the area 42 including the two monitor lines 41*a* and 41*b*.

The monitor line 41*a* on the – side of the Y axis is referred to as "first monitor line" 41*a*. The monitor line 41*b* on the + side of the Y axis is referred to as "second monitor line" 41*b*. The slit ray 31*a* to be emitted to the first monitor line 41*a* as an object to be irradiated will be referred to as the "first slit ray" 31*a*, and the slit ray 31*b* to be emitted to the second monitor line 41*b* will be referred to as the "second slit ray" 31*b*.

The interval between the first monitor line 41*a* and the second monitor line 41*b* is made coincide with the width of the body in the travel direction of a person so that an image of a state where a person passing the path 4 is passing either the first monitor line 41*a* or second monitor line 41*b* can be obtained. For example, when it is assumed that the width of the body in the travel direction of a person is 200 (mm), the interval between the first monitor line 41*a* and the second monitor line 41*b* is set to 200 (mm).

Figure 18:
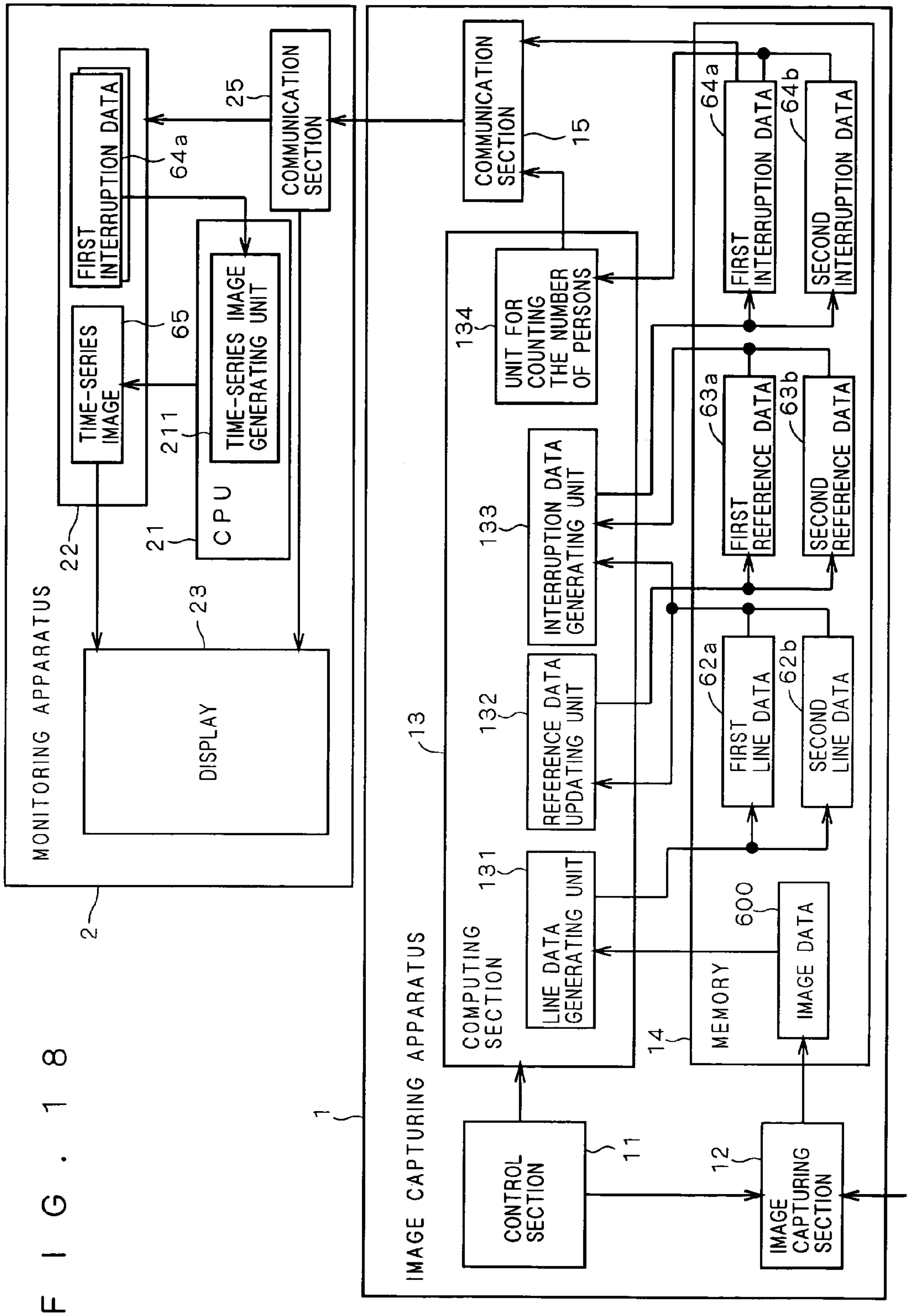
FIG. 18 is a diagram showing the functional configuration of the counting system of the second preferred embodiment.

FIG. 18 is a diagram showing the functional configuration of the image capturing apparatus 1 and the monitoring apparatus 2 of the counting system 102 in the second preferred embodiment. As understood from comparison between FIGS. 18 and 2, the functional configuration of the image capturing apparatus 1 and the monitoring apparatus 2 of the second preferred embodiment is similar to that of the first preferred embodiment. The flow of processes of the counting system 102 of the second preferred embodiment is also similar to that shown in FIG. 3. In a manner similar to the first preferred embodiment, the processes shown in FIG. 3 are repeated every predetermined time cycles, to be specific, every 1/30 second.

In the second preferred embodiment, however, the two monitor lines 41*a* and 41*b* are set, so that the processes performed by the processing units are slightly different from those of the first preferred embodiment. In the following, with reference to FIGS. 18 and 3, the different points of the processes from the first preferred embodiment will be described.

2-1. Line Data Generating Process

In the line data generating process (step S12 in FIG. 3) by the line data generating unit 131, on the basis of image data 600 obtained by the image capturing section 12, two pieces of line data (first line data 62*a* and second line data 62*b*) are generated.

Figure 19:
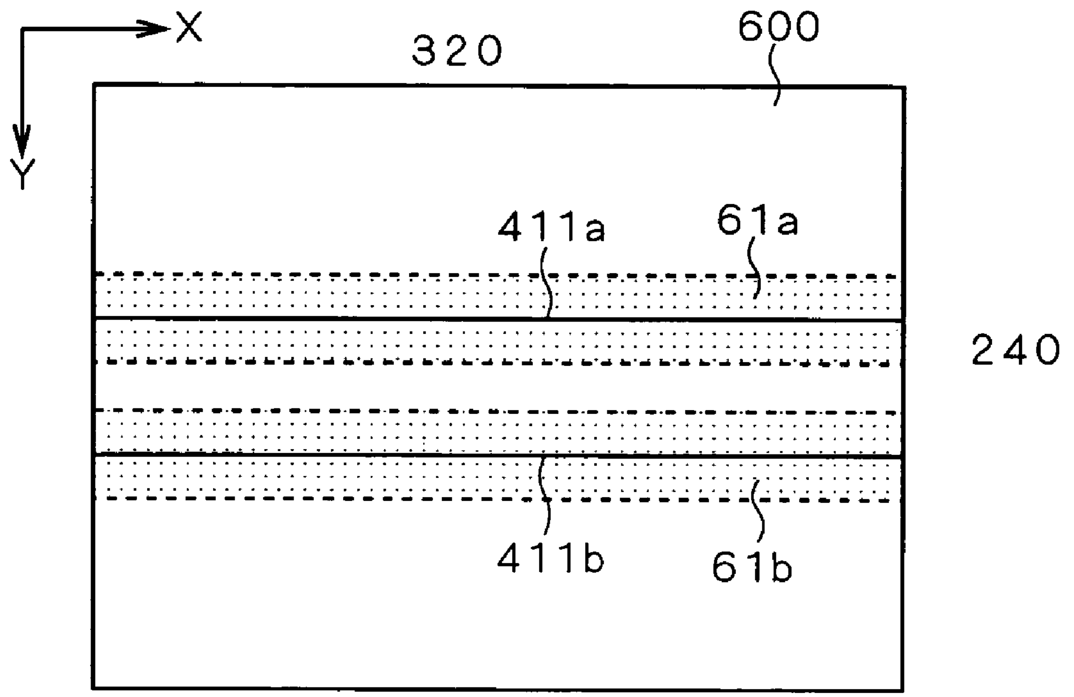
FIG. 19 is a diagram showing an example of image data obtained in the second preferred embodiment.

FIG. 19 shows the image data 600 obtained in the second preferred embodiment. As shown in the diagram, the image data 600 includes two monitor line images 411*a* and 411*b* along the X-axis direction.

The first line data 62*a* is generated on the basis of a region 61*a* to be processed consisting of 320 horizontal pixels×9 vertical pixels, which includes the monitor line image 411*a* indicative of the first monitor line 41*a*. On the other hand, the second line data 62*b* is generated on the basis of a region 61*b* to be processed consisting of 320 horizontal pixels×9 vertical pixels, which includes the monitor line image 411*b* indicative of the second monitor line 41*b*. A concrete method of generating line data from the region to be processed is similar to that in the first preferred embodiment. With the arrangement, the first line data 62*a* indicates the irradiation state of the first slit ray 31*a* on the first monitor line 41*a*. The second line data 62*b* indicates the irradiation state of the second slit ray 31*b* on the second monitor line 41*b*.

2-2. Reference Data Updating Process

In the reference data updating process (step S13 in FIG. 3) by the reference data updating unit 132, first reference data 63*a* is updated on the basis of the first line data 62*a*, and second reference data 63*b* is updated on the basis of the second line data 62*b*. A concrete method of updating the reference data 63*a* and 63*b* is similar to that of the first preferred embodiment. The first reference data 63*a* indicates the state of the first monitor line 41*a* when the first slit ray 31*a* is not interrupted. The second reference data 63*b* indicates the state of the second monitor line 41*b* when the second slit ray 31*b* is not interrupted.

2-3. Interruption Data Generating Process

In the interruption data generating process (step S14 in FIG. 3) by the interruption data generating unit 133, first interruption data 64*a* is generated on the basis of a result of comparison between the first line data 62*a* and the first reference data 63*a*, and second interruption data 64*b* is generated on the basis of a result of comparison between the second line data 62*b* and the second reference data 63*b*. A concrete method of generating the interruption data 64*a* and 64*b* is similar to that of the first preferred embodiment. The first interruption data 64*a* indicates the position in which the first slit ray 31*a* is interrupted on the first monitor line 41*a*. The second interruption data 64*b* indicates the position in which the second slit ray 31*b* is interrupted on the second monitor line 41*b*.

2-4. Process of Counting the Number of Persons

In the process of counting the number of persons (step S15 in FIG. 3) by the unit 134 for counting the number of persons, on the basis of the first interruption data 64*a* and the second interruption data 64*b*, the travel direction of a person is determined and the number of persons is counted in each of the travel directions of persons.

In the following, person information obtained from the first interruption data 64*a* generated most recently will be referred to as "first present data", and person information obtained from the past first interruption data 64*a* will be referred to as "first past data". Person information obtained from the second interruption data 64*b* generated most recently will be referred to as "second present data", and person information obtained from the past second interruption data 64*b* will be referred to as "second past data".

Each of the "first present data", "second present data", and "second past data" in the person information dealt in the process of counting the number of persons in the preferred embodiment is expressed by three pieces of coordinate information of a start coordinate, an end coordinate, and a barycentric coordinate in a manner similar to the first preferred embodiment. On the other hand, the "first past data" includes the three pieces of coordinate information and also data indicative of "the travel direction" of a corresponding person.

Figure 20:
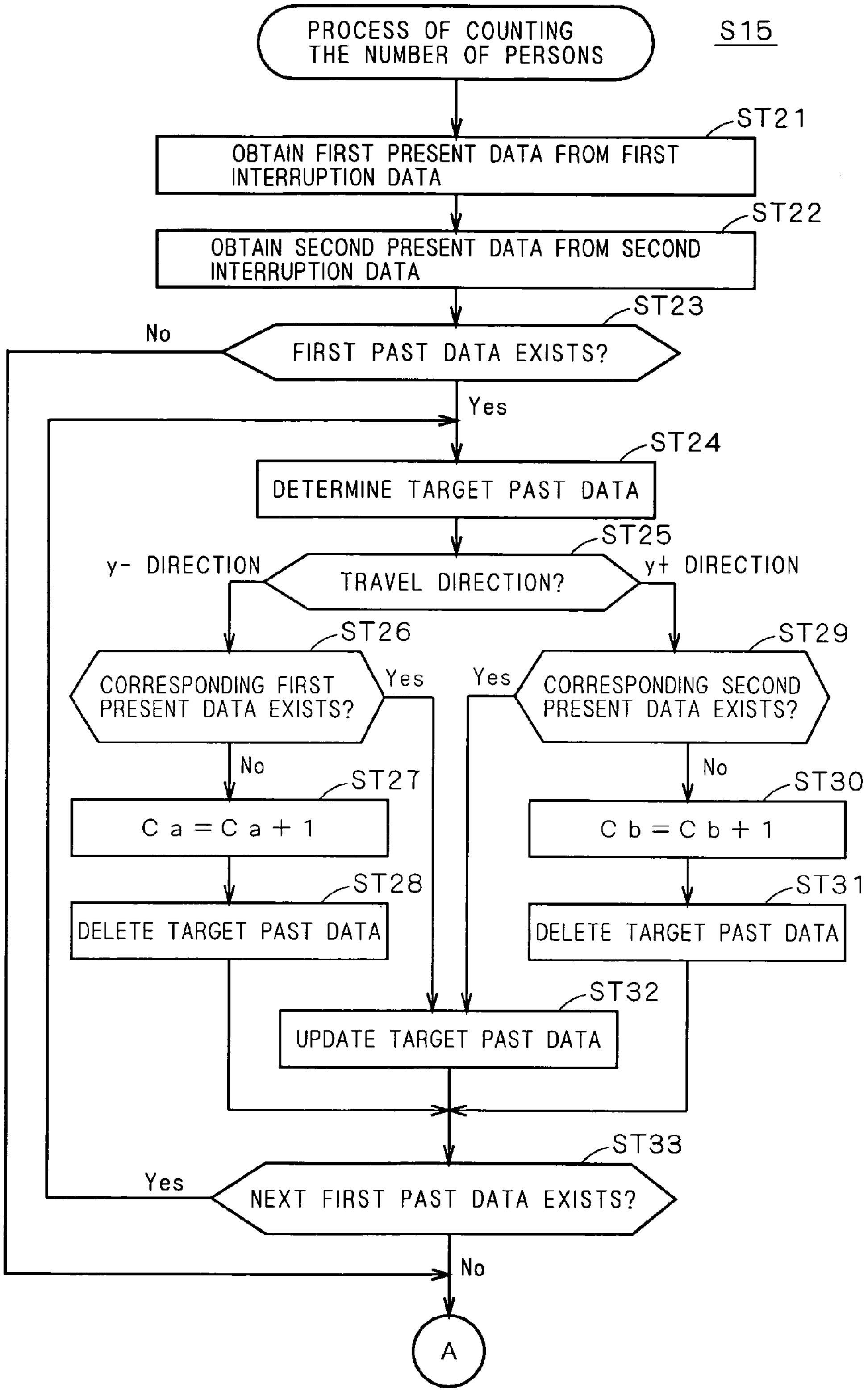
FIGS. 20 and 21 are diagrams showing the flow of a process of counting the number of persons of the second preferred embodiment.
Figure 21:
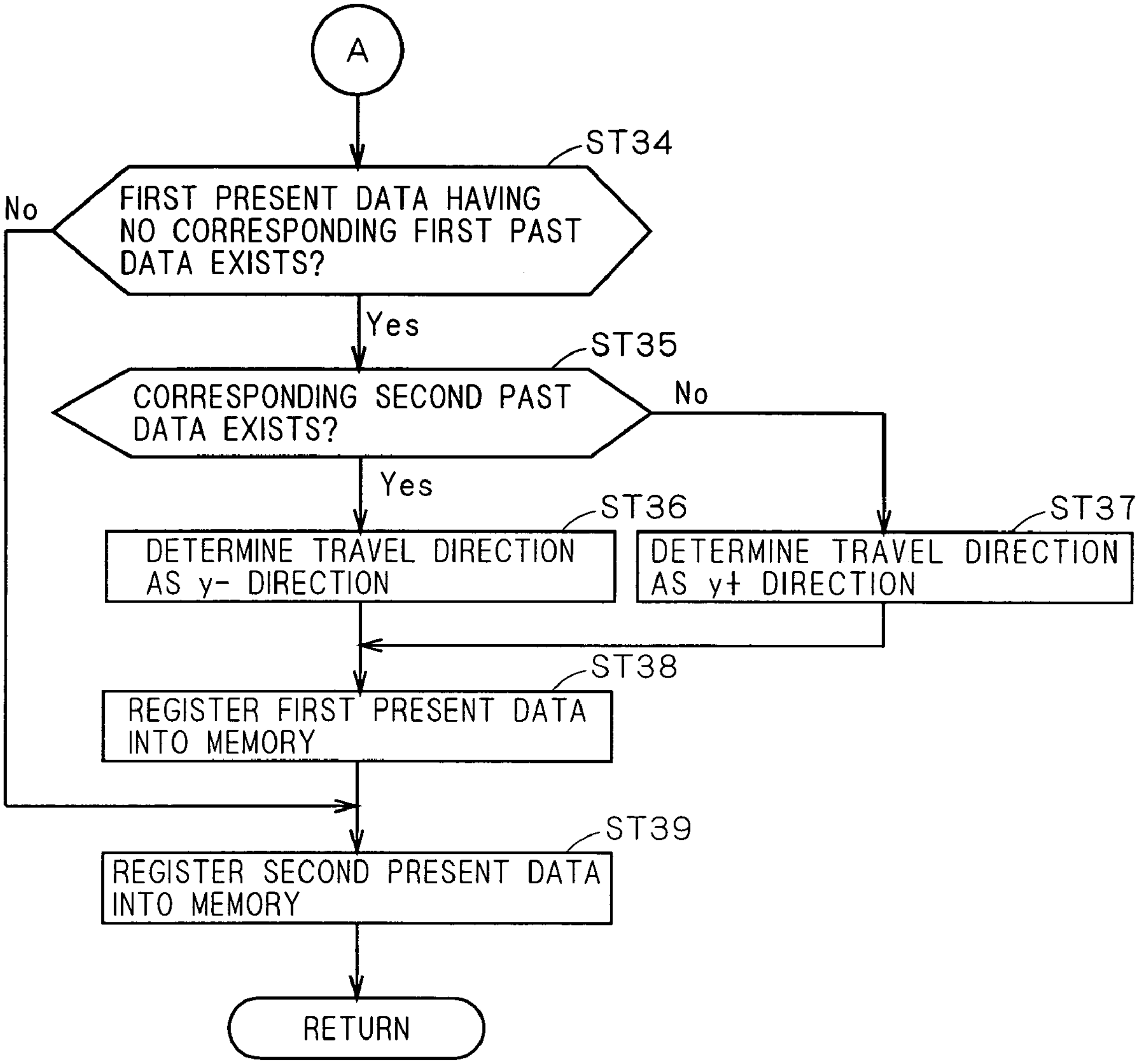

FIGS. 20 and 21 are flowcharts showing the flow of the process of counting the number of persons of the preferred embodiment. With reference to FIGS. 20 and 21, the flow of the process of counting the number of persons of the preferred embodiment will be described below.

First, by referring to the first interruption data 64*a* generated most recently, first present data is obtained (step ST21). Subsequently, by referring to the second interruption data 64*b* generated most recently, second present data is obtained (step ST22).

After that, the first past data stored in the memory 14 is referred to (step ST23). In the case where the first past data is not stored in the memory 14, the process advances to step ST34 in FIG. 21. On the other hand, when the first past data is stored in the memory 14, one piece of the first past data is determined as target past data to be processed thereafter (step ST24).

The "travel direction" included in the target past data is referred to (step ST25). If the travel direction is the Y− direction, the process advances to step ST26. If the travel direction is the Y+ direction, the process advances to step ST29.

The case where the "travel direction" is the Y− direction denotes the case where a person of the target past data travels in the direction from the second monitor line 41*b* toward the first monitor line 41*a*. In step ST26, therefore, to determine whether the person passed the first monitor line 41*a* or not, whether first present data corresponding to the target past data exists or not is determined. In the second preferred embodiment as well, whether two pieces of person information correspond to each other or not is determined by checking whether a deviation between the barycentric coordinates of the two pieces of person information is within a predetermined threshold (for example, 10 pixels) or not.

If the corresponding first present data does not exist, the person of the target past data has already passed the first monitor line 41*a*. Consequently, a variable Ca indicative of the first number of passing persons in the Y− direction is incremented by "1" (step ST27). The person information which became the target past data is eliminated from the memory 14 (step ST28).

If the corresponding first present data exists, the person of the target past data still interrupts the first slit ray 31*a* also at the present time point and is passing the first monitor line 41*a*. Consequently, the variable Ca indicative of the first number of passing persons is not incremented and the coordinate information of the person information in the memory 14 which became the target past data is updated to the coordinate information of the corresponding first present data (step ST32).

On the other hand, the case where the "travel direction" is the Y+ direction denotes the case where a person of the target past data travels in the direction from the first monitor line 41*a* toward the second monitor line 41*b*. In step ST29, therefore, to determine whether the person passed the second monitor line 41*b* or not, whether second present data corresponding to the target past data exists or not is determined.

If the corresponding second present data does not exist, the person of the target past data has already passed the second monitor line 41*b*. Consequently, a variable Cb indicative of the second number of passing persons in the Y+ direction is incremented by "1" (step ST30). The person information which became the target past data is eliminated from the memory 14 (step ST31).

If the corresponding second present data exists, the person of the target past data still interrupts the second slit ray 31*b* also at the present time point and is passing the second monitor line 41*b*. Consequently, the variable Cb indicative of the second number of passing persons is not incremented and the coordinate information of the person information in the memory 14 which became the target past data is updated to the coordinate information of the corresponding second present data (step ST32).

After one piece of the target past data is compared with the present data, the next target past data is determined (steps ST33 and ST24). In a manner similar to the above, the target past data is compared with present data. By repeating such a process, finally, all of the first past data pieces are compared with present data.

After all of the first past data is compared with the present data or in the case where no first past data is stored in the memory 14, whether first present data which does not correspond to any first past data exists in the first present data obtained in step ST21 or not is determined (step ST34 in FIG. 21).

In the case where the first present data which does not correspond to any first past data exists, the first present data indicates a new person who is passing the first monitor line 41 and interrupts the first slit ray 31*a*. Consequently, the first present data has to be registered as new person information into the memory 14. In the preferred embodiment, before the first present data is registered into the memory 14, the "travel direction" of the person indicated by the first present data is determined.

To determine the "travel direction", first, whether second past data corresponding to the first present data exists or not is determined (step ST35).

In the case where the corresponding second past data exists, the person of the first present data has passed the second monitor line 41*b* in the process of last time and passed the first monitor line 41*a* in the process of this time. Therefore, the "travel direction" of the person is determined as the "Y− direction" of travel from the second monitor line 41*b* to the first monitor line 41*a* (step ST36).

On the other hand, when the corresponding second past data does not exist, the person of the first present data has not passed both the two monitor lines 41*a* and 41*b* in the process of last time and has passed the first monitor line 41*a* in the process of this time. Therefore, the "travel direction" of the person is determined as the "Y+ direction" of travel from the first monitor line 41*a* to the second monitor line 41*b* (step ST37).

After the "travel direction" of the person of the first present data is determined, data obtained by adding the data indicative of the "travel direction" to the coordinate information of the first present data is registered as new person information into the memory 14 (step ST38). The registered person information is used as first past data in the process of counting the number of persons of the next time and thereafter.

After completion of the processes, the second present data is registered into the memory 14 so as to be used as second past data in the process of counting the number of persons of the next time and subsequent times (step ST39).

2-5. Process of Monitoring Apparatus

In the preferred embodiment, two results of counting performed in each of the travel directions are transmitted from the image capturing apparatus 1 to the monitoring apparatus 2 and displayed on the display 23. Only the first interruption data 64*a* out of the two interruption data 64*a* and 64*b* generated by the interruption data generating unit 133 is transmitted to the monitoring apparatus 2.

In the time-series image generating process (step S22 in FIG. 3), the time-series image generating unit 211 generates the time-series image 65 on the basis of the first interruption data 64*a*. A method of generating the time-series image 65 by the time-series image generating unit 211 is similar to that of the first preferred embodiment. The generated time-series image 65 is displayed on the display 23 together with the two results of counting.

As described above in the second preferred embodiment, in the counting system 102 of the preferred embodiment, at the time of counting the number of passing persons in the path 4, two line data 62*a* and 62*b* is generated and, further, two pieces of interruption data 64*a* and 64*b* are generated. On the basis of the two pieces of interruption data 64*a* and 64*b*, the travel direction of a person is determined. Thus, the number of passing persons can be counted in each of the travel directions of persons.

Although the number of pieces of line data (interruption data) used by the counting system is two in the preferred embodiment, it is also possible to set a predetermined number (more than two) of monitor lines in a path, irradiate the monitor lines with slit rays, and count the number of passing persons by using the predetermined number of line data (interruption data). Since the travel direction of a person can be determined from at least two line data (interruption data), by setting the number of line data (interruption data) used to two, the configuration can be simplified.

3. Modification

In the foregoing preferred embodiment, the line data generating unit, reference data updating unit, interruption data generating unit, and unit for counting the number of persons are set as the functions of the image capturing apparatus 1 and the time-series image generating unit is set as the function of the monitoring apparatus 2. The functions may be arbitrarily determined for each of the apparatuses. Specifically, a part of the processes performed by the image capturing apparatus 1 in the preferred embodiments may be performed by the monitoring apparatus 2. On the contrary, a part of the processes performed by the monitoring apparatus 2 may be performed by the image capturing apparatus 1.

Figure 22:
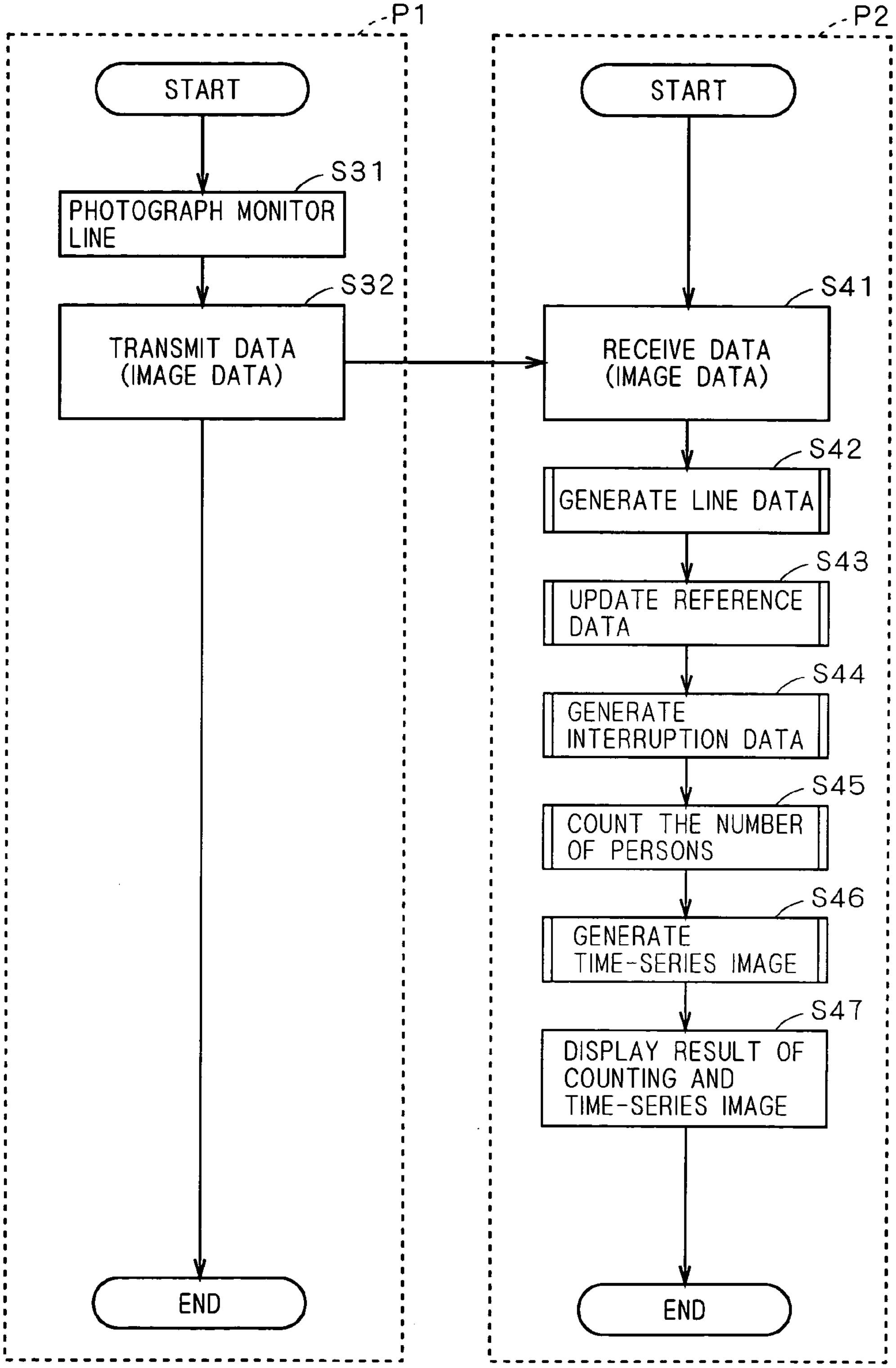
FIGS. 22 and 23 are diagrams showing the flow of processes of a counting system in a modification.

For example, all of the line data generating unit, reference data updating unit, interruption data generating unit, unit for counting the number of persons, and time-series image generating unit may be provided as the functions of the monitoring apparatus 2. In this case, as shown in FIG. 22, in the image capturing apparatus 1, only the process of photographing the monitor line (step S31) is performed and captured image data is transmitted from the image capturing apparatus 1 to the monitoring apparatus 2 (steps S32 and S41). In the monitoring apparatus 2, the line data generating process (step S42), reference data updating process (step S43), interruption data generating process (step S44), process of counting the number of persons (step S45), time-series image generating process (step S46), and process of displaying the result of counting and time-series images (step S47) are performed.

With the configuration, the amount of processes to be performed by the image capturing apparatus 1 can be reduced, and a general digital camera can be employed as the image capturing apparatus 1. By using only a region to be processed as image data to be transmitted from the image capturing apparatus 1 to the monitoring apparatus 2, the communication data amount can be decreased.

Figure 23:
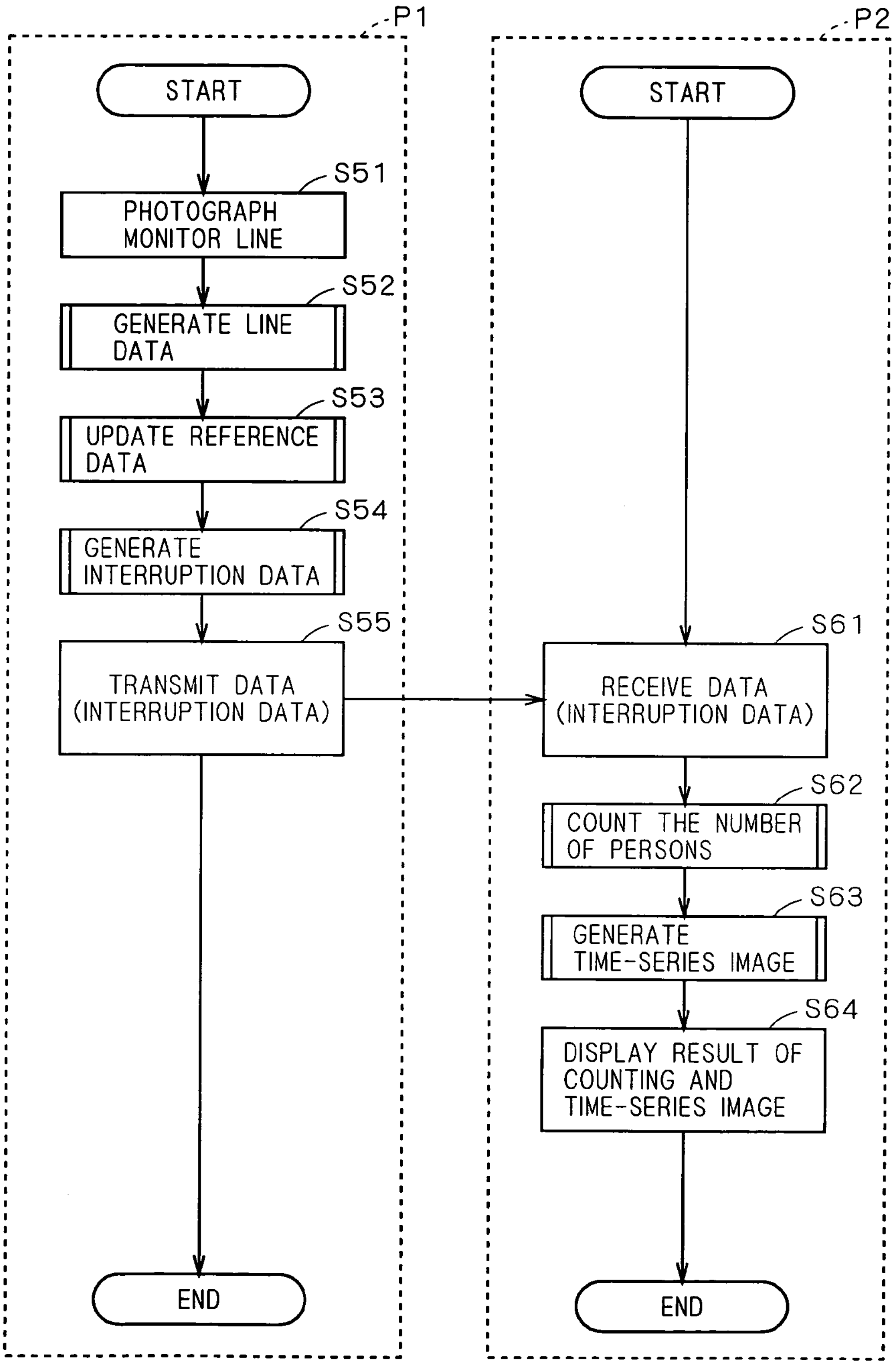

For example, the line data generating unit, reference data updating unit, and interruption data generating unit may be set as the functions of the image capturing apparatus 1, and the unit of counting the number of persons and the time-series image generating unit may be set as the functions of the monitoring apparatus 2. In this case, as shown in FIG. 23, in the image capturing apparatus 1, the process of photographing the monitor line (step S51), line data generating process (step S52), reference data updating process (step S53), and interruption data generating process (step S54) are performed. In the monitoring apparatus 2, the process of counting the number of persons (step S62), time-series image generating process (step S63), and process of displaying the result of counting and time-series images (step S64) are performed. In this case, only binary interruption data is transmitted from the image capturing apparatus 1 to the monitoring apparatus 2 (steps S55 and S61), the communication data amount can be reduced as much as possible.

Although the foregoing preferred embodiments have been described that the processes can be distributed and processed by the image capturing apparatus 1 and the monitoring apparatus 2, all of the processes may be performed by one apparatus having an image capturing section such as a digital camera and a display.

Although the subject in the foregoing preferred embodiments is a human being, any subject may be used as long as it is a movable body moving in a predetermined path, including a matter such as a baggage, a vehicle such as a car, an animal, and the like.

While the invention has been shown and described in detail, the foregoing description is in all aspects illustrative and not restrictive. It is therefore understood that numerous modifications and variations can be devised without departing from the scope of the invention.

What is claimed is:

1. A counting system for counting the number of passing objects in a path, comprising:

a light emitter for irradiating a line which extends along a width direction of said path with a slit ray;

an image capturing part for photographing said line to obtain an image;

a line data generator for generating one-dimensional line data indicative of an irradiation state of said slit ray on said line from the image obtained by said image capturing part;

a detection part for detecting said passing objects on the basis of said one-dimensional line data; and a counter for counting said number of said passing objects on the basis of said line data detected by said detection part, wherein said line data generator selects a statistical representative value from values of pixels of each pixel column arranged in a second direction orthogonal to a first direction corresponding to a direction of said line in said image, and sets said statistical representative value as a value of a pixel in said line data in the same position as each pixel column.

2. The counting system according to claim 1, wherein said statistical representative value includes the maximum value in the values of pixels in each pixel column.

3. The counting system according to claim 1, wherein said statistical representative value includes the maximum value in values each obtained by adding values of two neighboring pixels in each pixel column.

4. The counting system according to claim 1, further comprising:

an interruption data generator for comparing said line data with reference data indicative of a state of said line when said slit ray is not interrupted and generating one-dimensional interruption data indicative of a position in which said slit ray is interrupted on said line, wherein said counter counts said number of said passing objects on the basis of said interruption data.

5. The counting system according to claim 1, wherein said passing object is a person, and said slit ray is an invisible ray.

6. A counting system for counting the number of passing objects in a path, comprising:

a light emitter for irradiating a plurality of lines which extend along a width direction of said path and provided at intervals, respectively, with a plurality of slit rays;

an image capturing part for photographing said plurality of lines to obtain images;

a line data generator for generating a plurality of pieces of one-dimensional line data each indicative of an irradiation state of each of said slit rays on said plurality of lines, respectively, from the images obtained by said image capturing part;

a detection part for detecting said passing objects on the basis of said plurality of pieces of one-dimension line data; and a counter for determining travel directions of said passing objects on the basis of said plurality of pieces of one-dimensional line data, and counting said number of said passing objects detected by said detection part in each of the travel directions of said passing objects, wherein said line data generator selects a statistical representative value from values of pixels of each pixel column arranged in a second direction orthogonal to a first direction corresponding to a direction of said line in said image, and sets said statistical representative value as a value of a pixel in said line data in the same position as each pixel column.

7. The counting system according to claim 6, further comprising:

an interruption data generator for comparing said line data with reference data indicative of a state of said line when said slit ray is not interrupted and generating one-dimensional interruption data indicative of a position in which said slit ray is interrupted on said line, wherein said counter counts said number of said passing objects on the basis of said interruption data.

8. The counting system according to claim 6, wherein said passing object is a person, and said slit ray is an invisible ray.

9. A counting system for counting the number of passing objects in a path, comprising:

a light emitter for irradiating a line which extends along a width direction of said path with a slit ray;

an image capturing part for photographing said line to obtain an image;

a line data generator for generating one-dimensional line data indicative of an irradiation state of said slit ray on said line from the image obtained by said image capturing part;

a detection part for detecting said passing objects on the basis of said one-dimensional line data;

a counter for counting said number of said passing objects on the basis of said line data detected by said detection part; and an interruption data generator for comparing said line data with reference data indicative of a state of said line when said slit ray is not interrupted and generating one-dimensional interruption data indicative of a position in which said slit ray is interrupted on said line, wherein in said interruption data, a value of a pixel which serves as data in each of positions on said line is expressed by two values of a first value indicating that said slit ray is interrupted and a second value indicating that said slit ray is not interrupted, and wherein said counter counts said number of said passing objects on the basis of said interruption data.

10. The counting system according to claim 9, wherein said passing object is a person, and said counting system further comprises an extractor for extracting a group of pixels which are continuous with respect to position, each of which has said first value, and of which number exceeds a first reference value in said interruption data, as information indicative of said person on said line.

11. The counting system according to claim 9, further comprising:

a changing part for changing a value of a group of pixels which are continuous with respect to position, each of which has said second value, and of which number is less than a second reference value in said interruption data, to said first value.

12. The counting system according to claim 9, wherein said line is photographed in predetermined time cycles and said line data is generated in said predetermined time cycles from images obtained by the photographing, and said counting system further comprises an updating part for updating said reference data on the basis of a predetermined number of pieces of said line data generated most recently.

13. The counting system according to claim 9, wherein said line is photographed in predetermined time cycles and said interruption data is generated in said predetermined time cycles from images obtained by the photographing, and said counting system further comprises:

an image generator for generating time-series images each by connecting a predetermined number of pieces of said interruption data generated most recently in accordance with generation time; and a display for displaying said time-series images.

14. A method of counting the number of passing objects in a path, comprising the steps of:

(a) photographing a line which extends along a width direction of said path while irradiating said line with a slit ray;

(b) generating one-dimensional line data indicative of an irradiation state of said slit ray on said line from an image obtained in the step (a);

(c) detecting said passing objects on the basis of said one-dimensional line data; and (d) counting said number of said passing objects on the basis of said line data detected in step (c), wherein said one-dimensional line data is generated by selecting a statistical representative value from values of pixels of each pixel column arranged in a second direction orthogonal to a first direction corresponding to a direction of said line in said image, and said statistical representative value is set as a value of a pixel in said line data in the same position as each pixel column.

15. A method of counting the number of passing objects in a path, comprising the steps of:

(a) photographing a plurality of lines which extend along the width direction of said path and provided at intervals, respectively, while irradiating said plurality of lines with a plurality of slit rays;

(b) generating a plurality of pieces of one-dimensional line data each indicative of an irradiation state of each of said slit rays on said plurality of lines, respectively, from an image images obtained in the step (a);

(c) detecting said passing objects on the basis of said plurality of pieces of one-dimensional line data; and (d) determining travel directions of said passing objects on the basis of said plurality of pieces of one-dimensional line data, and counting said number of said passing objects detected in step (c) in each of the travel directions of said passing objects, wherein each of said plurality of pieces of one-dimensional line data is generated by selecting a statistical representative value from values of pixels of each pixel column arranged in a second direction orthogonal to a first direction corresponding to a direction of said line in said image, and said statistical representative value is set as a value of a pixel in said line data in the same position as each pixel column.

16. A counting system for counting the number of passing objects in a path, comprising:

a light emitter for making a slit ray image and for irradiating a line which extends along a width direction of said path with a slit ray;

an image capturing part for photographing said line to obtain a slit ray image data;

a line data generator for generating one-dimensional line data indicative of an irradiation state of said slit ray image from said slit ray image data obtained by said image capturing part; and a counter for counting said number of said passing objects on the basis of said one-dimensional line data, wherein said slit ray image breaks in a position in which the slit ray is interrupted by the passing objects, and wherein said line data generator selects a statistical representative value from values of pixels of each pixel column arranged in a second direction orthogonal to a first direction corresponding to a direction of said line in said image, and sets said statistical representative value as a value of a pixel in said line data in the same position as each pixel column.

17. A counting system for counting the number of passing objects in a path, comprising:

a light emitter for making a plurality of slit ray images and for irradiating a plurality of lines which extend along a width direction of said path and provided at intervals, respectively, with a plurality of slit rays;

an image capturing part for photographing said plurality of lines to obtain a plurality of pieces of slit ray image data;

a line data generator for generating a plurality of pieces of one-dimensional line data indicative of an irradiation state of each of said slit ray images, respectively, from said plurality of pieces of slit ray image data obtained by said image capturing part; and a counter for determining travel direction of said passing objects on the basis of said plurality of pieces of said slit ray image data and for counting said number of said passing objects in each of the traveling directions of said passing objects, wherein said slit ray images break in a position in which the slit ray is interrupted by the passing objects, and wherein said line data generator selects a statistical representative value from values of pixels of each pixel column arranged in a second direction orthogonal to a first direction corresponding to a direction of said line in said image, and sets said statistical representative value as a value of a pixel in said line data in the same position as each pixel column.

18. A method of counting the number of passing objects in a path, comprising the steps of:

(a) photographing a slit ray image on a line which extends along a width direction of said path to obtain a slit ray image data while irradiating said line with a slit ray;

(b) generating one-dimensional line data indicative of an irradiation state of said slit ray image from a slit ray image data obtained in the step (a); and (c) counting said number of said passing objects on the basis of said one-dimensional line data, wherein said slit ray image breaks in a position in which the slit ray is interrupted by the passing objects, and wherein said one-dimensional line data is generated by selecting a statistical representative value from values of pixels of each pixel column arranged in a second direction orthogonal to a first direction corresponding to a direction of said line in said image, and said statistical representative value is set as a value of a pixel in said line data in the same position as each pixel column.

19. A method of counting the number of passing objects in a path, comprising the steps of:

(a) photographing a plurality of slit ray images on lines which extend along the width direction of said path and provided at intervals to obtain a plurality of slit ray image data, respectively, while irradiating said plurality of lines with a plurality of slit rays;

(b) generating a plurality of pieces of one-dimensional line data each indicative of an irradiation stare of each of said slit ray images on said plurality of lines, respectively, from slit ray image data obtained in the step (a); and (c) determining travel directions of said passing objects on the basis of said plurality of pieces of one-dimensional line data, and counting said number of said passing objects in each of the travel directions of said passing objects, wherein said slit ray images break in a position in which the slit ray is interrupted by said passing objects, and wherein each of said plurality of pieces of one-dimensional line data is generated by selecting a statistical representative value from values of pixels of each pixel column arranged in a second direction orthogonal to a first direction corresponding to a direction of said line in said image, and said statistical representative value is set as a value of a pixel in said line data in the same position as each pixel column.

20. A counting system for counting the number of passing objects in a path, comprising:

a light emitter for irradiating a line which extends along a width direction of said path with a slit ray;

an image capturing part for photographing said line to obtain an image;

a line data generator for generating one-dimensional line data indicative of an irradiation state of said slit ray on said line from the image obtained by said image capturing part; and a counter for counting said number of said passing objects on the basis of said line data, wherein said line data generator selects a statistical representative value from values of pixels of each pixel column arranged in a second direction orthogonal to a first direction corresponding to a direction of said line in said image, and sets said statistical representative value as a value of a pixel in said line data in the same position as each pixel column.

21. A counting system for counting the number of passing objects in a path, comprising:

a light emitter for irradiating a plurality of lines which extend along a width direction of said path and provided at intervals, respectively, with a plurality of slit rays;

an image capturing part for photographing said plurality of lines to obtain images;

a line data generator for generating a plurality of pieces of one-dimensional line data each indicative of an irradiation state of each of said slit rays on said plurality of lines, respectively, from the images obtained by said image capturing part; and a counter for determining travel directions of said passing objects on the basis of said plurality of pieces of line data, and counting said number of said passing objects in each of the traveling directions of said passing objects, wherein said line data generator selects a statistical representative value from values of pixels of each pixel column arranged in a second direction orthogonal to a first direction corresponding to a direction of said line in said image, and sets said statistical representative value as a value of a pixel in said line data in the same position as each pixel column.

22. A counting system for counting the number of passing objects in a path, comprising:

a light emitter for irradiating a line which extends along a width direction of said path with a slit ray;

an image capturing part for photographing said line to obtain an image;

a line data generator for generating one-dimensional line data indicative of an irradiation state of said slit ray on said line from the image obtained by said image capturing part;

an interruption data generator for comparing said line data with reference data indicative of a state of said line when said slit ray is not interrupted and generating one-dimensional interruption data indicative of a position in which said slit ray is interrupted on said line; and a counter for counting said number of said passing objects on the basis of said interruption data, wherein in said interruption data, a value of a pixel which serves as data in each of positions on said line is expressed by two values of a first value indicating that said slit ray is interrupted and a second value indicating that said slit ray is not interrupted.

23. A counting system for counting the number of passing objects in a path, comprising:

a light emitter for irradiating a plurality of lines which extend along a width direction of said path and provided at intervals, respectively, with a plurality of slit rays;

an image capturing part for photographing said plurality of lines to obtain images;

a line data generator for generating a plurality of pieces of one-dimensional line data each indicative of an irradiation state of each of said slit rays on said plurality of lines, respectively, from the images obtained by said image capturing part;

an interruption data generator for comparing said plurality of pieces of one-dimensional line data with reference data indicative of a state of said lines when said slit ray is not interrupted and generating a plurality of one-dimensional interruption data indicative of a position in which each of said slit ray is interrupted on said lines, and a counter for determining travel directions of said passing objects on the basis of said interruption data, and counting said number of said passing objects in each of the traveling directions of said passing objects on the basis of said interruption data, wherein in said interruption data, a value of a pixel which serves as data in each of positions on said line is expressed by two values of a first value indicating that said slit ray is interrupted and a second value indicating that said slit ray is not interrupted.

* * * * *